(12) United States Patent
Fadda

(10) Patent No.: US 12,198,088 B2
(45) Date of Patent: Jan. 14, 2025

(54) WORKFLOW MANAGEMENT BASED ON RECOGNITION OF CONTENT OF DOCUMENTS

(71) Applicant: International Business Machines Corporation, Armonk, NY (US)

(72) Inventor: Claudio Fadda, Florence (IT)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 17/454,269

(22) Filed: Nov. 10, 2021

(65) Prior Publication Data

US 2023/0141849 A1 May 11, 2023

(51) Int. Cl.
  *G06Q 10/06* (2023.01)
  *G06F 18/21* (2023.01)
  (Continued)

(52) U.S. Cl.
  CPC ..... *G06Q 10/0633* (2013.01); *G06F 18/2178* (2023.01); *G06V 20/40* (2022.01); *G06V 20/44* (2022.01)

(58) Field of Classification Search
  CPC ..................................................... G06Q 10/06
  See application file for complete search history.

(56) References Cited

U.S. PATENT DOCUMENTS 8,214,238 B1 * 7/2012 Fairfield ............ G06Q 30/0203
                                                                705/7.29
10,176,196 B2   1/2019 Li
(Continued)

FOREIGN PATENT DOCUMENTS

CN   104854617 B   9/2019
CN   110727418 A   1/2020
(Continued)

OTHER PUBLICATIONS

J. Dinal Herath, Changxin Bai, Guanhua Yan, Ping Yang, and Shiyong Lu, RAMP: Real-Time Anomaly Detection in Scientific Workflows, State University of New York at Binghamton, 8 pages, 2019. (Year: 2019).*

(Continued)

*Primary Examiner* — Kurtis Gills
(74) *Attorney, Agent, or Firm* — Aaron N Pontikos

(57) ABSTRACT

A computer-implemented method for managing a workflow of a process includes: generating a recognition model defining objects, conditions of the objects, events, and tasks associated with the events of a process, wherein the tasks are based on changes of the conditions of the objects in the process; receiving configuration documents associated with the process; identifying, based on the recognition model, a defined object, and a defined condition in the configuration documents; identifying, based on the recognition model, a defined event, and a defined task in the configuration documents, wherein identifying the defined task in the configuration documents is further based on identifying a defined change in a condition of the object in the process; configuring a process model of the process based, at least in part, identified defined events and defined tasks over time; and managing a workflow of the process based on the configured process model.

18 Claims, 12 Drawing Sheets

(51) Int. Cl.
*G06Q 10/0633* (2023.01)
*G06V 20/40* (2022.01)

(56) References Cited

U.S. PATENT DOCUMENTS

| | | | |
|---|---|---|---|
| 2010/0031090 A1* | 2/2010 | Bernardini | G06F 11/366 |
| | | | 714/E11.002 |
| 2012/0137367 A1* | 5/2012 | Dupont | G06F 21/00 |
| | | | 726/25 |
| 2014/0180743 A1 | 6/2014 | Lin | |
| 2014/0280679 A1* | 9/2014 | Dey | H04L 67/568 |
| | | | 709/213 |
| 2016/0027278 A1* | 1/2016 | Mcintosh | G08B 21/0423 |
| | | | 715/741 |
| 2017/0109349 A1 | 4/2017 | Rosen | |
| 2018/0027006 A1* | 1/2018 | Zimmermann | G06F 21/6218 |
| | | | 726/11 |
| 2018/0204325 A1 | 7/2018 | Steigauf | |
| 2019/0013934 A1* | 1/2019 | Mercuri | G06N 20/00 |
| 2019/0182119 A1* | 6/2019 | Ratkovic | H04L 43/06 |
| 2020/0201650 A1* | 6/2020 | Huang | G06F 11/3051 |
| 2023/0046880 A1* | 2/2023 | Soon | G06Q 10/0633 |

FOREIGN PATENT DOCUMENTS

| | | | | |
|---|---|---|---|---|
| WO | WO-2007089274 A2 * | 8/2007 | | G06F 17/24 |
| WO | WO-2018073241 A1 * | 4/2018 | | A61B 5/0002 |

OTHER PUBLICATIONS

"Petri net", Wikipedia, This page was last edited on Sep. 13, 2021, 17 pages, <https://en.wikipedia.org/wiki/Petri_net>.

"System and Method for Process Discovery based on Movement Patterns of People or Objects", An IP.com Prior Art Database Technical Disclosure, Authors et al.: Disclosed Anonymously, IP.com No. IPCOM000198115D, IP.com Electronic Publication Date: Jul. 26, 2010, 8 pages.

Channgam et al., "Intelligent Information Management with Digitization Workflow", International Journal of Machine Learning and Computing, vol. 9, No. 6, Dec. 2019, doi: 10.18178/ijmlc.2019.9. 6.888, 7 pages.

Koschmider et al., "Ontology Based Business Process Description", Published In: EMOI—INTEROP'05, Enterprise Modelling and Ontologies for Interoperability, Proceedings of the Open Interop Workshop on Enterprise Modelling and Ontologies for Interoperability, Jun. 14, 2005, 13 pages.

Mell et al., "The NIST Definition of Cloud Computing", Recommendations of the National Institute of Standards and Technology, NIST Special Publication 800-145, Sep. 2011, 7 pages.

Zhou et al., "Building a Process Description Repository with Knowledge Acquisition", Published In: PKAW 2016: Knowledge Management and Acquisition for Intelligent Systems, Aug. 7, 2016, 15 pages.

* cited by examiner

WORKFLOW MANAGEMENT BASED ON RECOGNITION OF CONTENT OF DOCUMENTS

BACKGROUND

The present invention relates to the field of information technology, and more specifically, to workflow management.

Workflow management is a common need in organizations, such as companies, hospitals, and plants. Generally, workflow management is aimed at orchestrating execution of a repeatable pattern of activities (e.g., physical operations, employee scheduling, software scheduling), of which such activities are organized into one or more processes (e.g., business functions, triages, product manufacturing).

SUMMARY

According to one embodiment of the present invention, a computer-implemented method for managing a workflow of a process is disclosed. The computer-implemented method includes generating a recognition model defining objects, conditions of the objects, events, tasks associated with the events of a process. The tasks are based on one or more changes of conditions of objects in the process. The computer-implemented method further includes receiving configuration documents having information associated with the process. The computer-implemented method further includes identifying, based on the recognition model, at least one object, and at least one condition in the configuration documents. The computer-implemented method further includes identifying, based on the recognition model, an event, and a task in the configuration documents. Identifying the task in the configuration documents is further based on identifying a change in a condition of an object in the process. The computer-implemented method further includes configuring a process model of the process based, at least in part, identified events and tasks over time. The process model sequences one or more modeled tasks based, at least in part, on one or more modeled events. The computer-implemented method further includes managing a workflow of the process based on the configured process model.

According to another embodiment of the present invention, a computer program product for managing a workflow of a process is disclosed. The computer program product includes one or more computer readable storage media and program instructions stored on the one or more computer readable storage media. The program instructions include instructions to generate a recognition model defining objects, conditions of the objects, events, tasks associated with the events of a process. The tasks are based on one or more changes of conditions of objects in the process. The program instructions further include instructions to receive configuration documents having information associated with the process. The program instructions further include instructions to identify, based on the recognition model, at least one object, and at least one condition in the configuration documents. The program instructions further include instructions to identify, based on the recognition model, an event, and a task in the configuration documents. Identifying the task in the configuration documents is further based on identifying a change in a condition of an object in the process. The program instructions further include instructions to configure a process model of the process based, at least in part, identified events and tasks over time. The process model sequences one or more modeled tasks based, at least in part, on one or more modeled events. The program instructions further include instructions to manage a workflow of the process based on the configured process model.

According to another embodiment of the present invention, a computer system for managing a workflow of a process is disclosed. The computer system includes one or more computer system includes one or more computer processors, one or more computer readable storage media, and program instructions stored on the computer readable storage media for execution by at least one of the one or more processors. The program instructions include instructions to generate a recognition model defining objects, conditions of the objects, events, tasks associated with the events of a process. The tasks are based on one or more changes of conditions of objects in the process. The program instructions further include instructions to receive configuration documents having information associated with the process. The program instructions further include instructions to identify, based on the recognition model, at least one object, and at least one condition in the configuration documents. The program instructions further include instructions to identify, based on the recognition model, an event, and a task in the configuration documents. Identifying the task in the configuration documents is further based on identifying a change in a condition of an object in the process. The program instructions further include instructions to configure a process model of the process based, at least in part, identified events and tasks over time. The process model sequences one or more modeled tasks based, at least in part, on one or more modeled events. The program instructions further include instructions to manage a workflow of the process based on the configured process model.

DETAILED DESCRIPTION

Figure 1A:
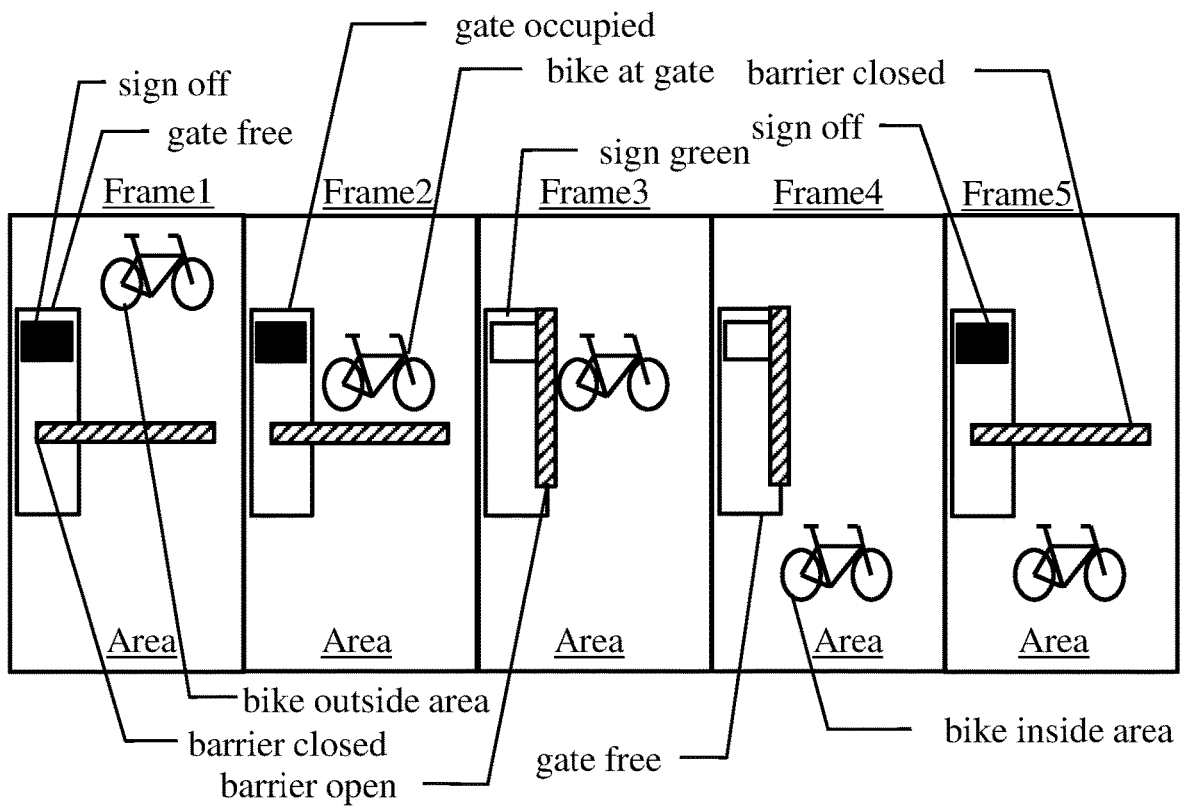
FIG. 1A illustrates recognition of conditions of an exemplary document in accordance with at least one embodiment of the present invention.

The present invention relates to the field of information technology, and more specifically, to workflow management.

Workflow management of complex processes is quite challenging. Therefore, workflow management systems (WFMSs) are generally used to provide an infrastructure for setting-up, controlling, and monitoring workflows. For this purpose, the workflow management system implements a workflow management (software) application, which automates execution of processes by directly handling the activities that may be automated, and providing information/documents that are required to perform those activities requiring human intervention. The workflow management application is based on a process model of each process whose workflow has to be managed. The process may be defined by a series of tasks, whose execution is sequenced in response to events. Formally, the process model defines the process as a discrete-event dynamic system (DEDS) (i.e., a system having discrete states over time whose evolution depends on discrete events). For this purpose, the process model is expressed in a textual process definition language (e.g., BPEL) that may be interpreted by the workflow management application (to manage the workflow of one or more processes). Moreover, graphical tools are also available to facilitate the definition of the process model via a graphical interface aimed at non-programmers. These graphical tools provide a definition of the process model that is then converted into the required process definition language. The conversion may be performed automatically, semi-automatically (especially when more complex behaviors need to be integrated in the process), or manually (simply guiding the definition of the process in the process definition language).

The formal definition of the process model is quite complex (especially when many subjects are part of the workflow, such as persons, machines, and sensors). Particularly, this requires a strong manual effort by one or more Subject-Matter Experts (SMEs) with high competencies in the relevant context. At first, experts collect information (typically from heterogenous documents, such as laws, regulations, best practices, guidelines, policies, and human knowledge) relevant to the process. The experts then customize the information collected for the specific context (such as their company, hospital, plant). At this point, the experts identify the tasks whose execution has to be managed, order them, and afterward, identify the events that trigger the execution of the tasks. In the end, the experts correlate the events with the tasks to define their dependencies.

Embodiments of the present invention recognize that the above-mentioned operations take a relatively long time, are relatively difficult and demanding, and require many human resources. In any case, the obtained result is strongly tied to the ability and experience of the experts. Accordingly it is difficult to leverage operations already performed in similar situations, and in the end, the resulting process model may be not completely satisfactory. Moreover, the process model also generally needs to be updated over time. As previously stated above, updating the process model is time consuming, complex, expensive, dependent on skills of the experts, scarcely reproducible, and oftentimes far from optimal.

For example, whenever an error occurs due to something that should not have happened, the experts must investigate the cause of the error in order to identify and fix the process model accordingly. However, identifying and fixing the process model often relies solely on the intuition and experience of the experts. For this purpose, the experts go back in time, trying to understand what has gone wrong. However, this requires determining the occurred events and the performed tasks, ordering them in succession, and analyzing the obtained time sequence.

Moreover, even though the process model may be able to be updated to cope with changes in the process, the process model is unable to react to these changes. This ultimately renders the process model outdated for a relatively long time (at least until an administrator in charge of managing the process becomes aware of them). Accordingly, embodiments of the invention recognize the need for improved methods and systems for updating process models and implementing changes made to process models.

Typical applications of the workflow management are in companies, hospitals, plants, infrastructures, public services, transport systems, and so on. The process includes a set of activities that interact among them to achieve a desired result (e.g., transforming materials, providing services, processing information). The process may relate to, for example, a business function, triage, product manufacturing, infrastructure operation, service provisioning, or traffic control. Each activity of the process is any action that is performed for a purpose (functional to achieve the result of the process). Examples of these activities includes physical operations (such as storing products in a warehouse, opening/closing a gate, starting/stopping a machine, filling an airplane, printing a certificate, or starting a train), employee tasks (such as deciding a selling price, assigning priority to a patient, controlling quality of a product, controlling an identity card, approving a document, or issuing a travel ticket) or software management (such as launching a software program, invoking a service, or reading/writing a database).

For a particular purpose, a workflow management system is provided implementing a workflow management (software) application. The workflow management application directly handles the activities of the process that may be automated, and provides information and/or documents that are required to perform the activities of the process requiring human intervention (e.g., actuating machines, automatically launching software programs, notifying persons, supplying documents, or prompting manual inputs). The workflow management application in based on a (process) model, which defines the workflow of the process formally (in a corresponding process definition language). Particularly, the process model sequences tasks depending on events. Each task includes one or more activities that contribute to achieve the result of the process. Examples of these tasks include deciding on a marketing strategy, accepting a patient into a hospital, performing a manufacturing phase of a product, controlling take-off of an airplane, granting an administrative authorization, and installing a traffic light. Each event is any occurrence that is notable. Examples of these events include the generation of a selling report, the arrival of a patient at an emergency room, the receipt of a manufacturing order, the landing of an airplane, the request of a certificate, and the delay of a train.

Generally, the process model includes nodes that define the corresponding states of the process over time, of which the states depend on the evolution of the process, and allow for the determination as to how the process will evolve in the future. Moreover, the process model includes transitions from a (source) state to a (target) state, in which a transition is triggered by an event and may involve the execution of a task at the entry of a target state.

According to embodiments of the present invention, a configuration of a process model is supported by the recognition of the content of one or more configuration documents. For this purpose, a recognition model is provided. The recognition model defines one or more objects that are relevant for the process. Each object is any physical entity that may be perceived. Examples of these objects are persons, gates, machines, airplanes, certificates, and timetables. The recognition model defines one or more conditions of the objects that are relevant for the process. Each condition is an arrangement of the corresponding object that may change over time. Examples of these conditions are an advertising campaign being approved, a person waiting for a doctor, a product being completed, a service being delivered, and a train being stopped. The recognition model defines one or more events that are relevant for the process, each event being one or more changes of the conditions of one or more objects. Likewise, the recognition model defines one or more tasks that are relevant for the process, each task being one or more changes of the conditions of one or more objects. For example, the recognition model is generated semi-automatically by identifying all of the objects and all of the conditions thereof in a plurality of documents (e.g., via deep learning techniques). The objects and the conditions that are relevant are then selected among them, and the events and the tasks are determined according to the changes of these conditions over time by one or more subject matter experts (SMEs).

In general, the documents can be any artefact providing information relating to the process, such as videos, photos, audios, texts or multimedia files, files formatted in a formal language (such as XML, Jason and the like), and responses from software programs. One or more objects are recognized in the documents according to the recognition model. Moreover, one or more conditions of these objects are recognized in the documents according to the recognition model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1A illustrates recognition of conditions of an exemplary document in accordance with at least one embodiment of the present invention. As depicted in FIG. 1A, a document is divided into a sequence of 5 frames (Frame 1-Frame5). The frame sequence depicts a very simple scenario schematically, wherein a person riding a bike enters a restricted traffic area via a gate thereof. In this case, the following objects are recognized in the frame sequence: "gate", "barrier", "sign" and "bike". Moreover, the following conditions are recognized in the same frame sequence: "gate being free" (in frames 1,4,5), "gate being occupied" (in frames 2-3), "barrier being closed" (in frames 1,2,5), "barrier being open" (in frames 3-4), "sign being off" (in frames 1-2,5), "sign being green" (in frames 3-4), "bike being outside area" (in frame 1), "bike being at gate" (in frames 2-3), and "bike being inside area" (in frames 4-5).

Figure 1B:
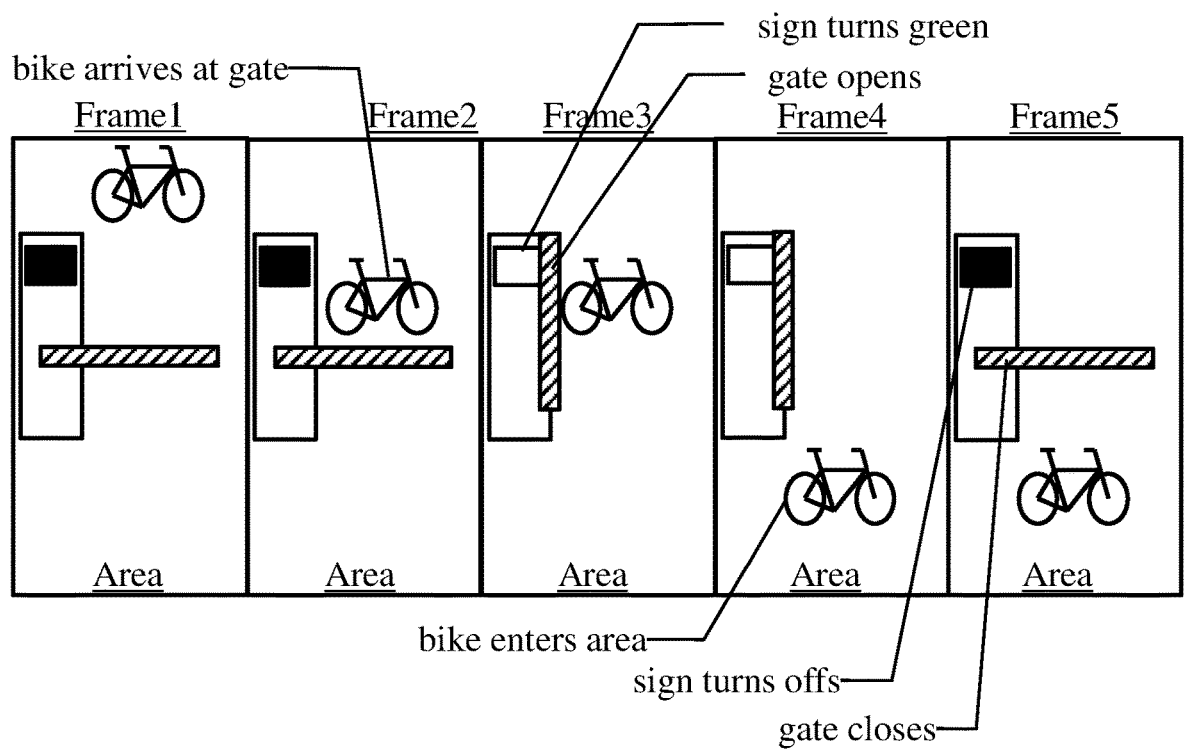
FIG. 1B illustrates recognition of events and tasks associated with the exemplary document in accordance with at least one embodiment of the present invention.

FIG. 1B illustrates recognition of events and tasks associated with the exemplary document in accordance with at least one embodiment of the present invention. As depicted in FIG. 1B, one or more events, and one or more tasks are recognized in the document according to a recognition model. Here, each recognized event and/or task is based on one or more changes of the conditions of one or more objects that have been recognized in the document. Particularly, an event "bike arrives at gate" is recognized based on the change from the condition "bike being outside area" (in frame 1) to the condition "bike being at gate" (in frame 2). Likewise, an event "bike enters area" is recognized based on the change from the condition "bike being at gate" (in frame 3) to the condition "bike being inside area" (in frame 4). Moreover, a task "barrier opens, sign turns green" is recognized based on the change from the condition "barrier being closed" (in frame 2) to the condition "barrier being open" (in frame 3), and on the change from the condition "sign being off" (in frame 2) to the condition "sign being green" (in frame 3). Likewise, a task "barrier closes, sign turns off" is recognized based on the change from the condition "barrier being open" (in frame 4) to the condition "barrier being closed" (in frame 5), and on the change from the condition "sign being green" (in frame 4) to the condition "sign being off" (in frame 5).

Figure 1C:
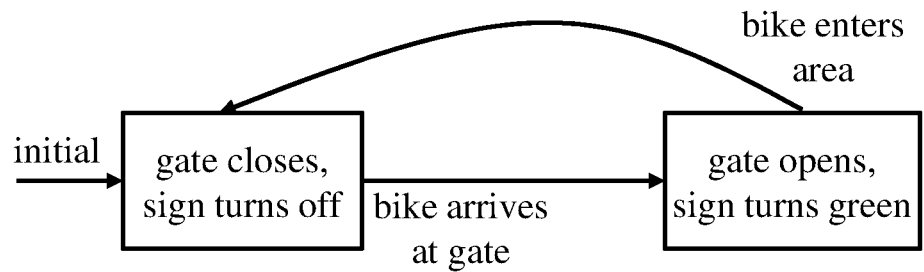
FIG. 1C illustrates an exemplary process model configured based on the events and the tasks that have been recognized over time in accordance with FIG. 1B.

FIG. 1C illustrates an exemplary process model configured based on the events and the tasks that have been recognized over time in accordance with FIG. 1B. Particularly, the process model includes the following inferences: (i) in an (initial) state, the event "bike arrives at gate" triggers the transition to another state involving the execution of the task "barrier opens, sign becomes green"; (ii) in this state, the event "bike enters area" triggers the transition to the previous state involving the execution of the task "barrier closes, sign turns off". This (very simple) process model is represented in FIG. 1C with a corresponding state diagram, wherein corresponding circles denote the states of the process with their possible tasks, and corresponding arrows denote the events.

The above-described solution significantly streamlines the configuration of the process model. Particularly, this makes the operation faster and simpler by requiring a lower amount of human resources, and is less expensive, more reliable, and reproducible in similar situations. In other words, the above-described solution allows for easier and faster optimization of process models.

Figure 2A:
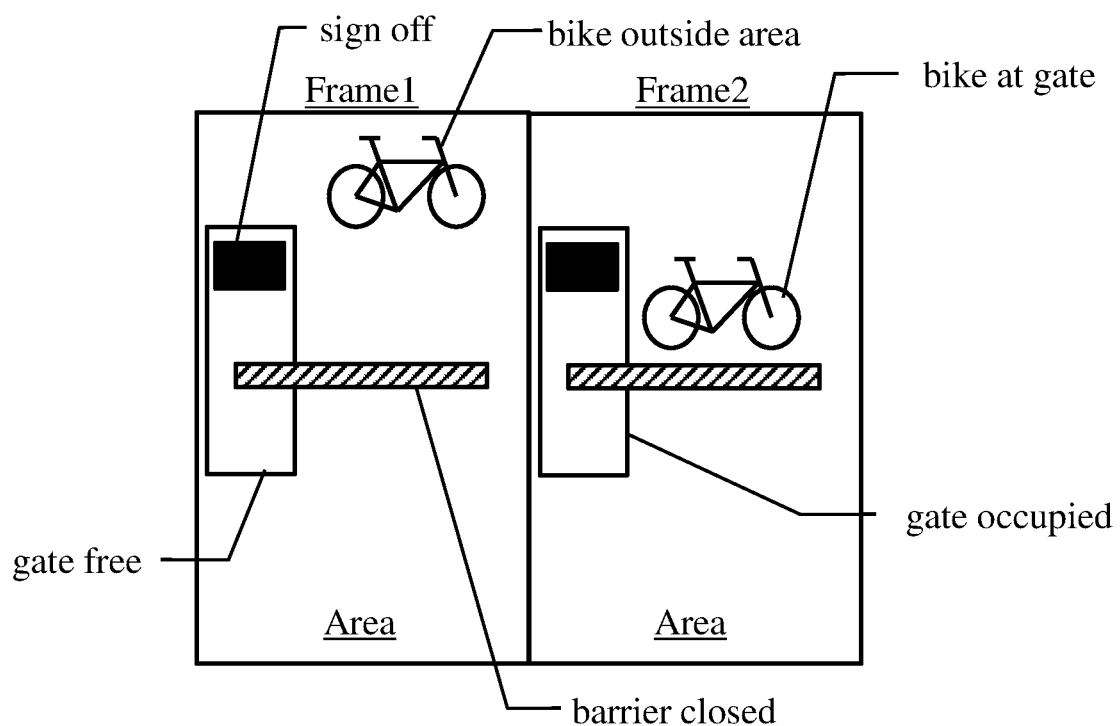
FIG. 2A illustrates an exemplary management of the workflow of a process using the process model of FIG. 1C in accordance with at least one embodiment of the present invention.

FIG. 2A illustrates an exemplary management of the workflow of a process using the process model of FIG. 1C in accordance with at least one embodiment of the present invention. Particularly, a workflow management application triggers the transition from each state to another state in response to the corresponding event (starting from the initial state). In addition, the same solution described above may also be used to recognize the events controlling the workflow of the process. For this purpose, the events are recognized from the content of one or more documents as above. As depicted in FIG. 2A, a document is divided into a sequence of 2 frames (Frame 1-Frame2). The frame sequence depicts a very simple scenario schematically, wherein a person riding a bike arrives at the gate of the restricted traffic area. In this case, the following objects are recognized in the frame sequence: "gate", "barrier", "sign", and "bike". Moreover, the following conditions are recognized in the same frame sequence: "gate being free" (in frame 1), "gate being occupied" (in frame 2), "barrier being closed" (in frames 1-2), "sign being off" (in frames 1-2), "bike being outside area" (in frame 1), and "bike being at gate" (in frame 2).

Figure 2B:
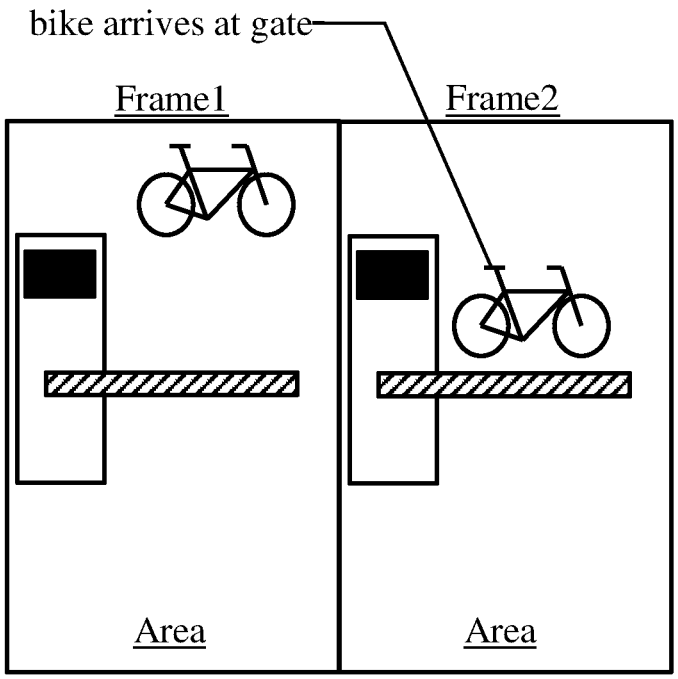
FIG. 2B, illustrates an exemplary recognition of events and tasks associated with the exemplary document in accordance with at least one embodiment of the present invention.

FIG. 2B, illustrates an exemplary recognition of events and tasks associated with the exemplary document in accordance with at least one embodiment of the present invention. As depicted in FIG. 2B, one or more events, and one or more tasks are recognized in the document according to a recognition model. Particularly, an event "bike arrives at gate" is recognized based on the change from the condition "bike being outside area" (in frame 1) to the condition "bike being at gate" (in frame 2). Therefore, assuming that the process is in its initial state, the event "bike arrives at gate" triggers the transition causing the execution of the task "gate opens, sign becomes green".

The above-mentioned solution according to an embodiment of the present disclosure for configuring the process model may be used either in a preparation mode or in a production mode. Particularly, in the preparation mode, a corpus of documents is collected and used to recognize the events and the tasks whose execution is involved by them. This information is then used to configure the process model (either from scratch or incrementally), in which the process model is then deployed into production for controlling the workflow of the process. In addition or in the alternative, and in the case of the production mode, the same operations performed for controlling the workflow of the process are also used to recognize any anomaly in the workflow of the process that defines a new pattern of the process (for example, due to its repetition). This information is then used to update the process model as above (for example, after a manual confirmation by an expert). As a result, the process model may self-adapt to changes of the process dynamically by learning from experiences acquired during the control of its workflow.

Figure 3A:
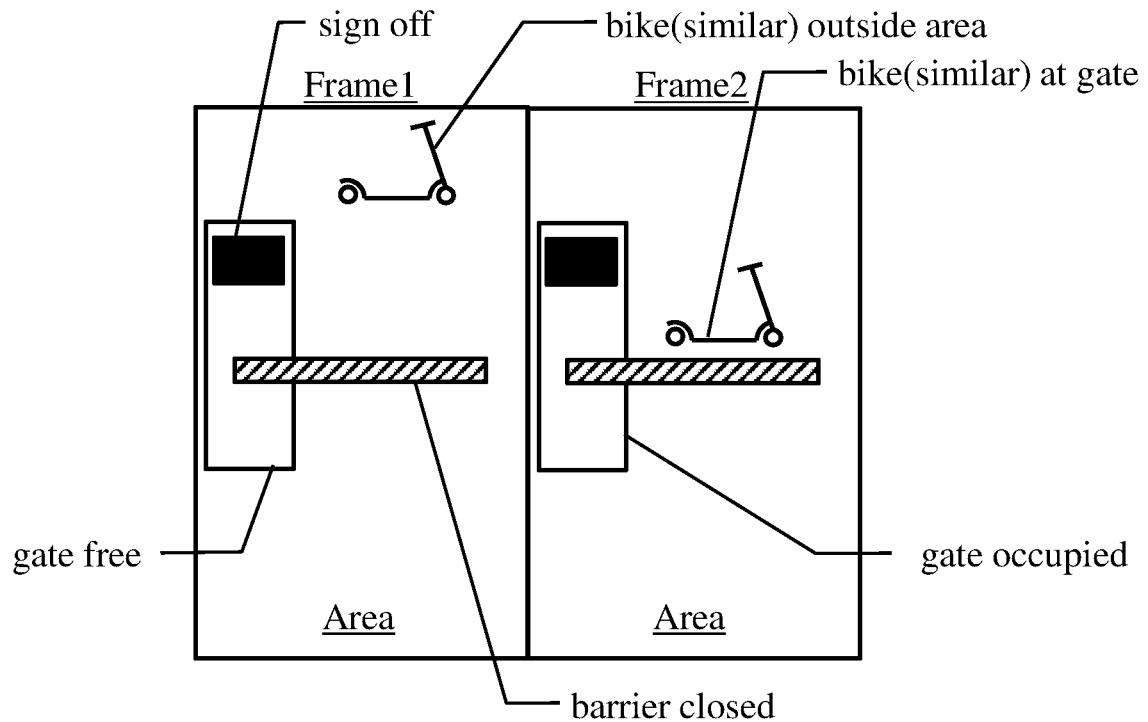
FIG. 3A illustrates an exemplary recognition of unusual events that are similar to those events controlling the workflow of a process in accordance with at least one embodiment of the present invention.

FIG. 3A illustrates an exemplary recognition of unusual events that are similar to those events controlling the workflow of a process in accordance with at least one embodiment of the present invention. For example, the above-mentioned operations for recognizing each event from the content of documents is based on a corresponding confidence index. Particularly, the event is recognized when the confidence index reaches a predetermined threshold. Conversely, when the confidence index does not reach the predetermined threshold, the event is not recognized. Nevertheless, if the confidence index is only slightly lower than the threshold, an unusual event similar to a particular event may be recognized. Whenever an unusual event is recognized, a corresponding (unusual event) warning is output (for example, to an administrator in charge of managing the workflow).

The unusual event may then be treated in different ways. Particularly, the unusual event may be simply discarded. For example, this may happen in critical processes where it is of the utmost importance to ensure that the tasks are executed only when they are correct. Conversely, the unusual event may be accepted as the event to which it is similar, thereby triggering the corresponding transition. For example, this may happen in non-critical processes where slight changes in the workflow may be tolerated (even if the result may not be not correct).

For example, and as depicted in FIG. 3A, a document is divided into a sequence of 2 frames (Frame1-Frame2). The frame sequence depicts a very simple scenario schematically, wherein a person riding an (electric/push) scooter arrives at the gate of the restricted traffic area. In this case, the following objects are recognized in the frame sequence: "gate", "barrier", and "sign". Moreover, an object that is not a "bike", but it is similar thereto (i.e., the scooter) is recognized ("bike (similar)"). Moreover, the following conditions are recognized in the same frame sequence: "gate being free" (in frame 1), "gate being occupied" (in frame 2), "barrier being closed" (in frames 1-2), "sign being off" (in frames 1-2), "bike (similar) being outside area" (in frame 1), and "bike (similar) being at gate" (in frame 2).

Figure 3B:
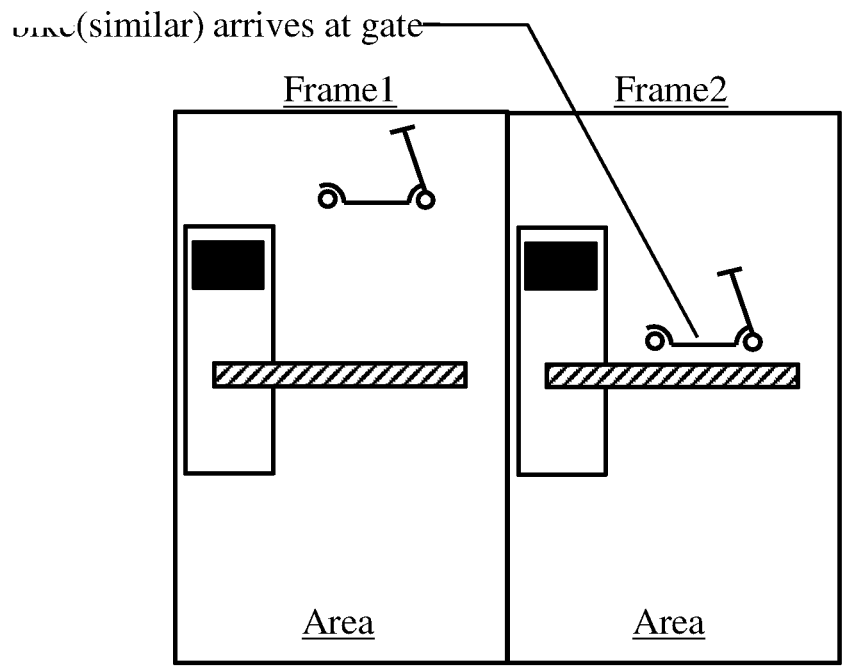
FIG. 3B illustrates an exemplary recognition of events and tasks associated with an exemplary document in accordance with at least one embodiment of the present invention.

FIG. 3B illustrates an exemplary recognition of events and tasks associated with an exemplary document in accordance with at least one embodiment of the present invention. As depicted in FIG. 3B, one or more events, and one or more tasks are recognized in the document according to a recognition model. Particularly, an event "bike (similar) arrives at gate" is recognized based on the change from the condition "bike (similar) being outside area" (in frame 1) to the condition "bike (similar) being at gate" (in frame 2). Therefore, assuming again that the process is in its initial state, the event "bike (similar) arrives at gate" triggers the same transition involving the execution of the task "gate opens, sign becomes green". As a result, the person riding the scooter then enters the restricted traffic area (as should reasonably be allowed similar to the person riding the bike), even without any knowledge of the corresponding circumstance in the process model.

Figure 4A:
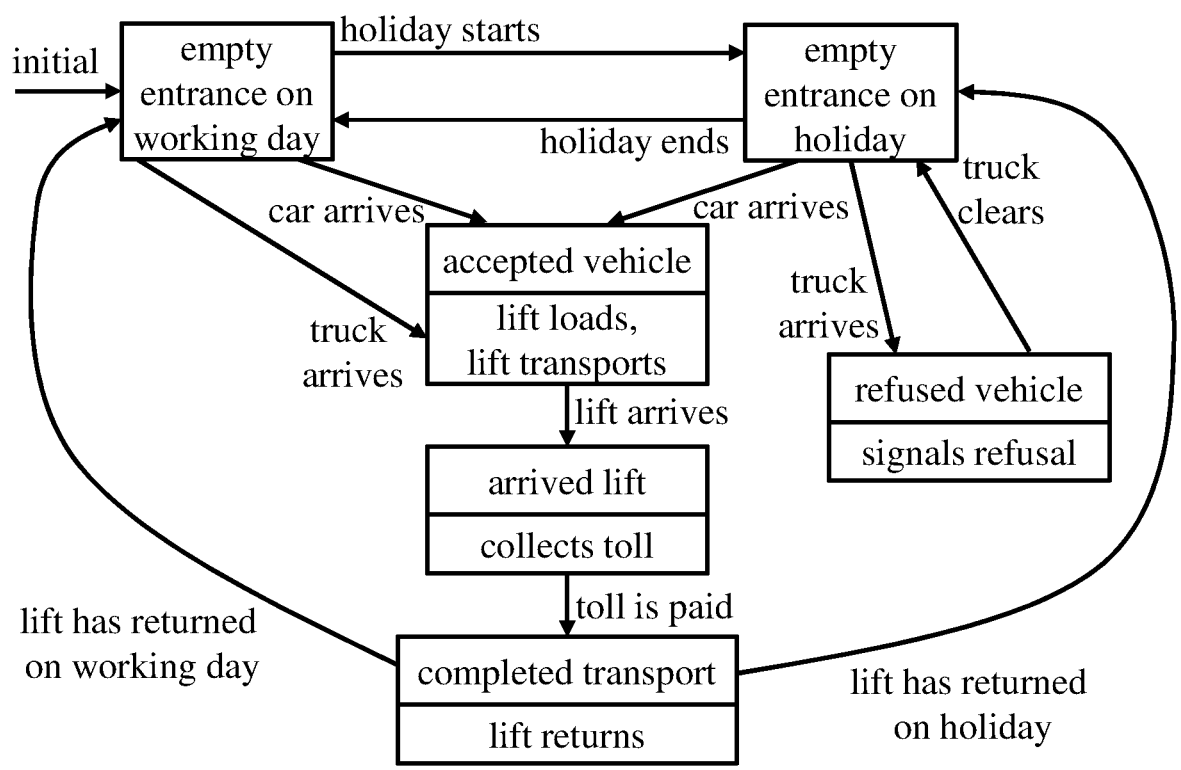
FIG. 4A illustrates an exemplary state diagram of a process in accordance with at least one embodiment of the present invention.

FIG. 4A illustrates an exemplary state diagram of a process in accordance with at least one embodiment of the present invention. As evinced by the process model of FIG. 4, it is also possible to handle unexpected events that are defined in the process model, but that are not expected at a current state of the process. It should be noted that whenever an unexpected event is detected, a corresponding (unexpected event) warning is output (for example, to an administrator).

In an embodiment, an unexpected event is discarded (such as in critical processes). Conversely, the current state of the process may be changed to another (expected) state at which the event is instead expected, and then it may be accepted, thereby triggering the corresponding transition (such as in non-critical processes when the expected state is within a maximum distance from the current state).

For example, FIG. 4A depicts a state diagram of a very simple process for using a vehicle lift. Starting from an initial state when an entrance of the (vehicle) lift is at an origin floor is empty on a working day (state "empty entrance on working day"), the start of a holiday (event "holiday starts") triggers the transition to a state ("empty entrance on holiday") for controlling the lift differently. Conversely, in the state "empty entrance on holiday", the end of the holiday (event "holiday ends") triggers the transition to the state "empty entrance on working day". The arrival of a car at the entrance of the lift (event "car arrives") both in the state "empty entrance on working day", and in the state "empty entrance on holiday", and the arrival of a truck at the entrance of the lift (event "truck arrives") only in the state "empty entrance on working day" triggers the transition to a state ("accepted vehicle") involving the execution of a task for transporting the car/truck to a destination floor (task "lift loads, lift transports"). In this state, the arrival of the lift to the destination floor (event "lift arrives") triggers the transition to a state ("arrived lift") involving the execution of a task for collecting a corresponding toll (task "collects toll"). In this state, the payment of the toll (event "toll is paid") triggers the transition to a state ("completed transport") involving the execution of a task for returning the lift to the origin floor (task "lift returns"). In this state, the arrival of the lift to the origin floor on a working day (event "lift has returned on working day") triggers the transition to the state "empty entrance on working day", whereas the arrival of the lift to the origin floor on a holiday (event "lift has returned on holiday") triggers the transition to the state "empty entrance on holiday". Instead, the same arrival of a truck at the entrance of the lift (event "truck arrives") in the state "empty entrance on holiday" triggers the transition to a state ("refused vehicle") involving the signaling of the refusal of the transport of the truck (task "signals refusal"). In this state, the clearing of the entrance of the lift by the truck (event "truck clears") triggers the transition to the state "empty entrance on holiday".

Figure 4B:
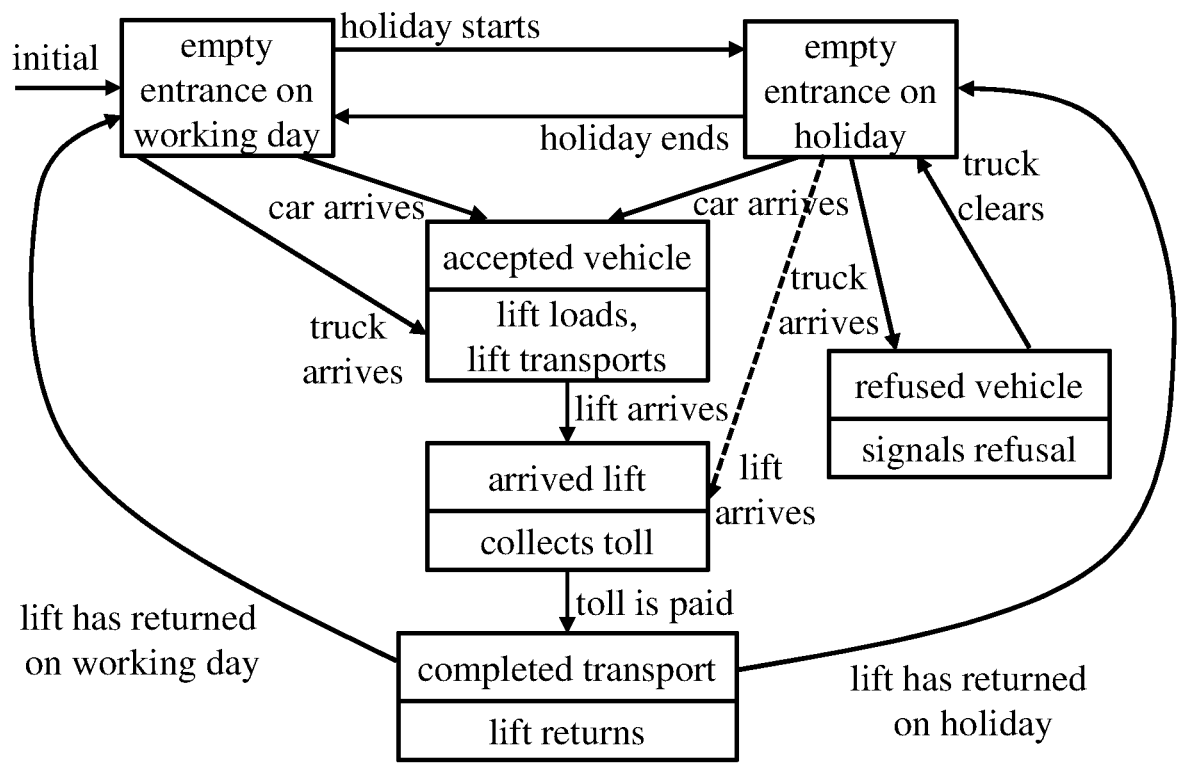
FIG. 4B illustrates an exemplary state diagram of a process in accordance with at least one embodiment of the present invention.

FIG. 4B illustrates an exemplary state diagram of a process in accordance with at least one embodiment of the present invention. As depicted in FIG. 4B, the state "lift arrives" occurs when the process is in the state "empty entrance on holiday" (for example, because of a special need of transporting a truck on a holiday). The event "lift arrives" is then unexpected, since no truck should be transported on a holiday. In this case, another (expected) state wherein the event "lift arrives" is instead expected is determined (the state "arrived lift" in the example at issue). The process is then forced to this state (as shown by the dotted line arrow), so as to allow the workflow to proceed in this case as well. The truck is then transported when a special need occurs on a holiday (in the same way of the working days as it should reasonably happen), even without any knowledge of the corresponding circumstance in the process model.

The notification of unusual events and/or of unexpected events allows for detecting corresponding changes in the process promptly. As a result, it is possible to react to these changes (by updating the process model accordingly) relatively quickly. This limits the periods during which the process model might be outdated.

Moreover, when unusual events and/or unexpected events are accepted, the process model is capable of coping with slight changes of the process automatically (without requiring any human intervention). Particularly, the acceptance of unusual events allows managing events that are not exactly the same as the events being already known in the process model. In addition and/or in the alternative, the acceptance of the unexpected events allows managing events that occur in exceptional circumstances. In both cases, this result is achieved without any change to the process model, thereby adding resiliency thereto.

The unusual/unexpected events (for example, when the same unusual/unexpected events repeat frequently) may also trigger a corresponding revision of the process model. For this purpose, the same documents used for controlling the workflow of the process may be used as above to recognize tasks corresponding to repeating unusual/unexpected events. In an embodiment, the process model is updated automatically. In an embodiment, the process model is updated after a manual confirmation by a subject matter expert.

As an example, let us consider a very simple process for managing the sharing of cars. The workflow of the process is controlled by monitoring a (software) application for managing a rental of the cars and videos from cameras installed at authorized parking lots for dropping the cars. A recognition model is provided for recognizing the cars, the parking lots, and the application (objects). Moreover, the recognition model allows recognizing when a car is in use, is dropped off, is in the parking lot, and when the application is idle, is ending a rental of a car, is sending a message to a user, is charging a fee for a rental, and is charging a fine. The recognition model also allows for recognizing when a user drops off a car at a parking lot and when the user ends a rental by entering a corresponding command into the application via an app (events), and when the application charges a fee for a rental, when the application charges a fine, and when the application sends a message to a user (tasks).

A corresponding process model is used to control the workflow of the process. Particularly, whenever a user drops off a car at a parking lot and ends its rental (event), the application charges the corresponding fee (task). An unusual event may occur when a user drops off a car at a parking lot without ending its rental. Moreover, an unexpected event may occur when a user ends the rental of a car that is not parked in any parking lot. In both cases, corresponding unusual/unexpected notifications are output. Moreover, the resulting anomalies may also be used to revise the process model. For example, this happens when the unusual/unexpected events repeat frequently (followed by the same activities, such as triggered manually by an operator noticing the corresponding anomalies). Particularly, after the unusual event of a car that is dropped off at a parking lot without ending its rental, the application sends a message to the corresponding user asking him/her to end the rental (task). Likewise, after the unexpected event of the end of a rental of a car that is not parked in any parking lot, the application charges a fine, and the car is recovered and brought back to the parking lot (task). Therefore, the process model may be updated accordingly by adding corresponding new states with transitions thereto triggered by the unusual/unexpected events, in which the transitions involve the execution of the corresponding tasks.

Figure 5:
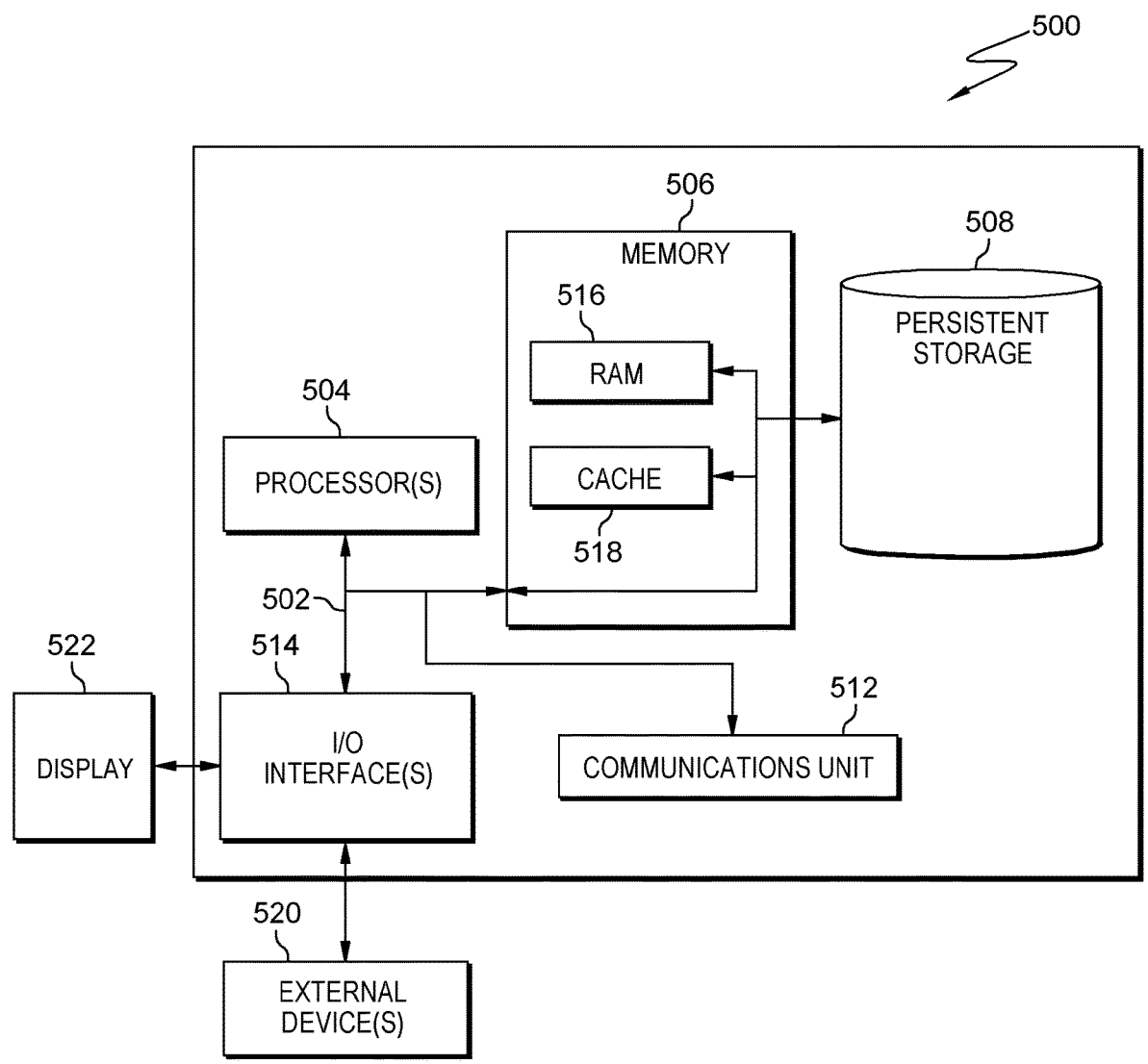
FIG. 5 is a block diagram depicting components of an exemplary computing device, generally designated 500, suitable for practicing various embodiments of the present invention.

FIG. 5 is a block diagram depicting components of a computing device, generally designated 500, suitable for practicing various embodiments of the present invention. Computing device 500 includes one or more processor(s) 504 (including one or more computer processors), communications fabric 502, memory 506 including. RAM 516 and cache 518, persistent storage 508, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 5804, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media.

Program instructions used to practice various embodiments of the present invention can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

Figure 6:
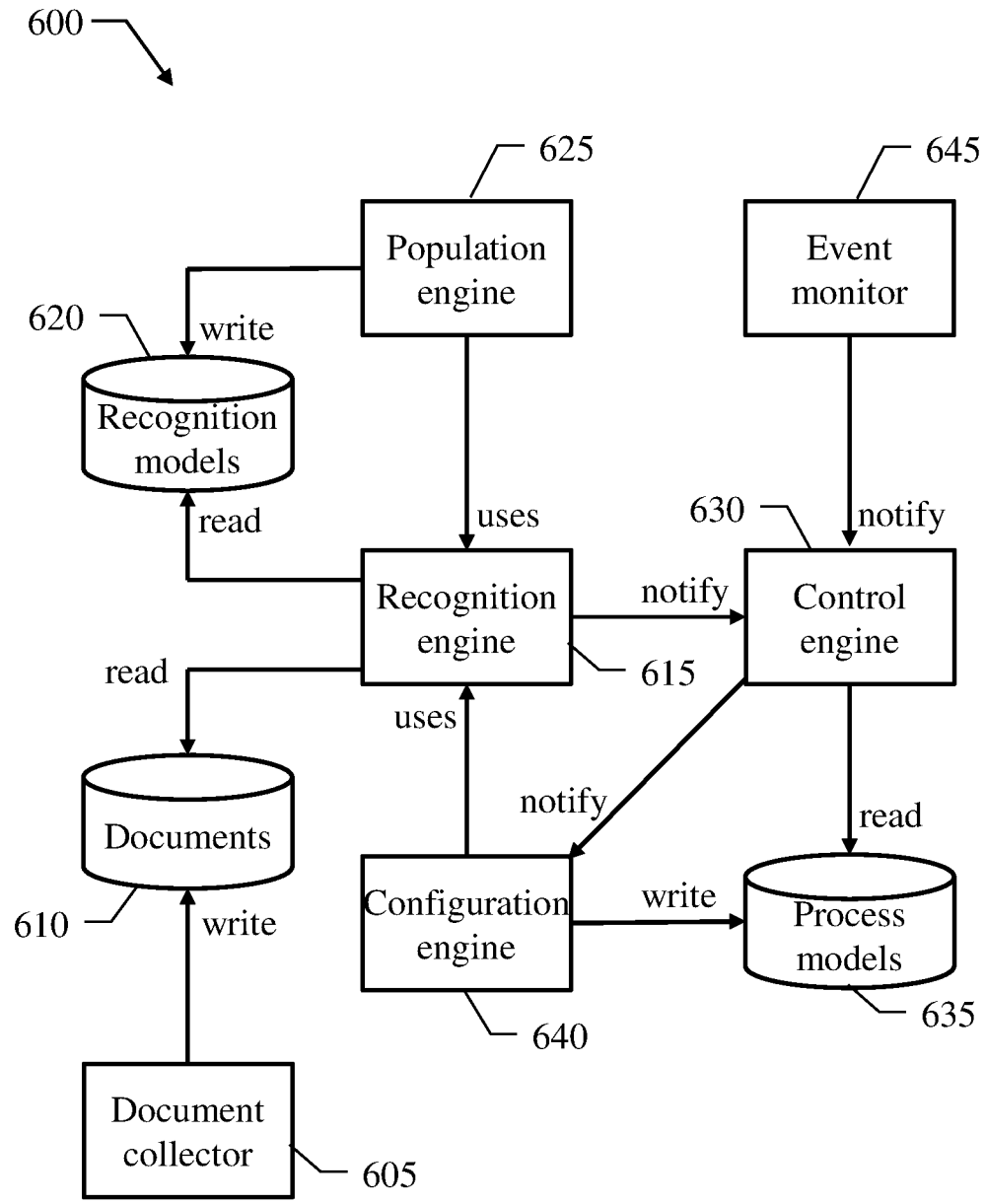
FIG. 6 depicts software components or computer modules, generally designated 600, used to practice various embodiments of the present invention.

FIG. 6 depicts software components or computer modules, generally designated 600, used to practice various embodiments of the present invention. The software components are typically stored in the mass memory and loaded (at least partially) into the working memory of the computer when the programs are running, together with an operating system and other application programs not directly relevant to the solution of the present invention (thus omitted in the figure for the sake of simplicity). The programs are initially installed into the mass memory, for example, from removable storage units or from a network (such as the Internet). In this respect, each program may be a module, segment or portion of code, which comprises one or more executable instructions for implementing the specified logical function.

A document collector 605 collects the documents to be used for populating the recognition model, configuring the process model, and/or controlling the workflow of the processes to be managed. The document collector 605 writes a document repository 610 that temporarily stores the collected documents yet to be processed. A recognition engine 615 recognizes objects, their conditions, changes of these conditions, and events/tasks based on them in the documents. The recognition engine 615 employs a Graphical User Interface (GUI) for allowing subject matter experts to interact with it. The recognition engine 615 reads the document repository 610 and a recognition model repository 620. The recognition model repository 620 stores the recognition model of each process whose workflow has to be managed. The recognition model indicates objects, conditions, events, and tasks that are relevant for the process (i.e., the events and the tasks that may be used to define its process model and the conditions of the objects whose changes over time may define them). For each of these relevant entities (objects, conditions, events and tasks), the recognition model indicates how to recognize them in the documents and a corresponding descriptive tag.

For example, the recognition of the objects/conditions may be implemented with Artificial Intelligence (AI) techniques. In this case, the recognition engine 615 is a neural network that may detect each object and condition thereof in the documents, and that may classify it by determining corresponding probabilities by matching the relevant objects/conditions, and then selecting the relevant object/condition with the highest probability. For this purpose, the relevant objects and the relevant conditions of the recognition model are defined by parameters of the neural network (such as channels and weights). The recognition model lists the relevant events and the relevant tasks. For relevant event/task, the recognition model indicates one or more changes of the relevant conditions of the relevant objects that define it.

A population engine 625 populates the recognition model. The population engine 625 employs a GUI for allowing the subject matter experts to interact with it. The population engine 625 uses the recognition engine 615 and writes to the recognition model repository 620.

A control engine 630 controls the workflow of each process. The control engine 630 may be implemented either as a custom component or as a standard workflow management application. In the later case, this allows integrating the solution according to an embodiment of the present invention with any existing workflow management system without requiring any modification thereof, thereby making this solution of general applicability in a very fast and simple way. The control engine 630 reads a process model repository 635. The process model repository 635 stores the process model of each process. The process model indicates the states of the process (with a pointer to the initial one and a pointer to the current one), the (modeled) events that trigger the transitions among the states, and the (modeled) tasks whose execution may be involved by the transitions (in a formal process definition language, for example, BEPL, XPDL, and YAWL). Moreover, the process model may also indicate the criticality of the process. For example, each individual task or group of tasks of a process is associated with a criticality indicator that is associated with the task/process.

A configuration engine 640 configures the process model. The configuration engine 640 employs a GUI for allowing the subject matter experts to interact with it. The configuration engine 640 is notified of any anomaly in the workflow of the process by the control engine 630. Moreover, the configuration engine 640 uses the recognition engine 615 and writes to the process model repository 635.

An event monitor 645 monitors the event detectors for the events that are detected by them. The recognition engine 615 notifies the events that have been recognized and the event monitor 645 notifies the events that have been detected to the control engine 630.

Figure 7A:
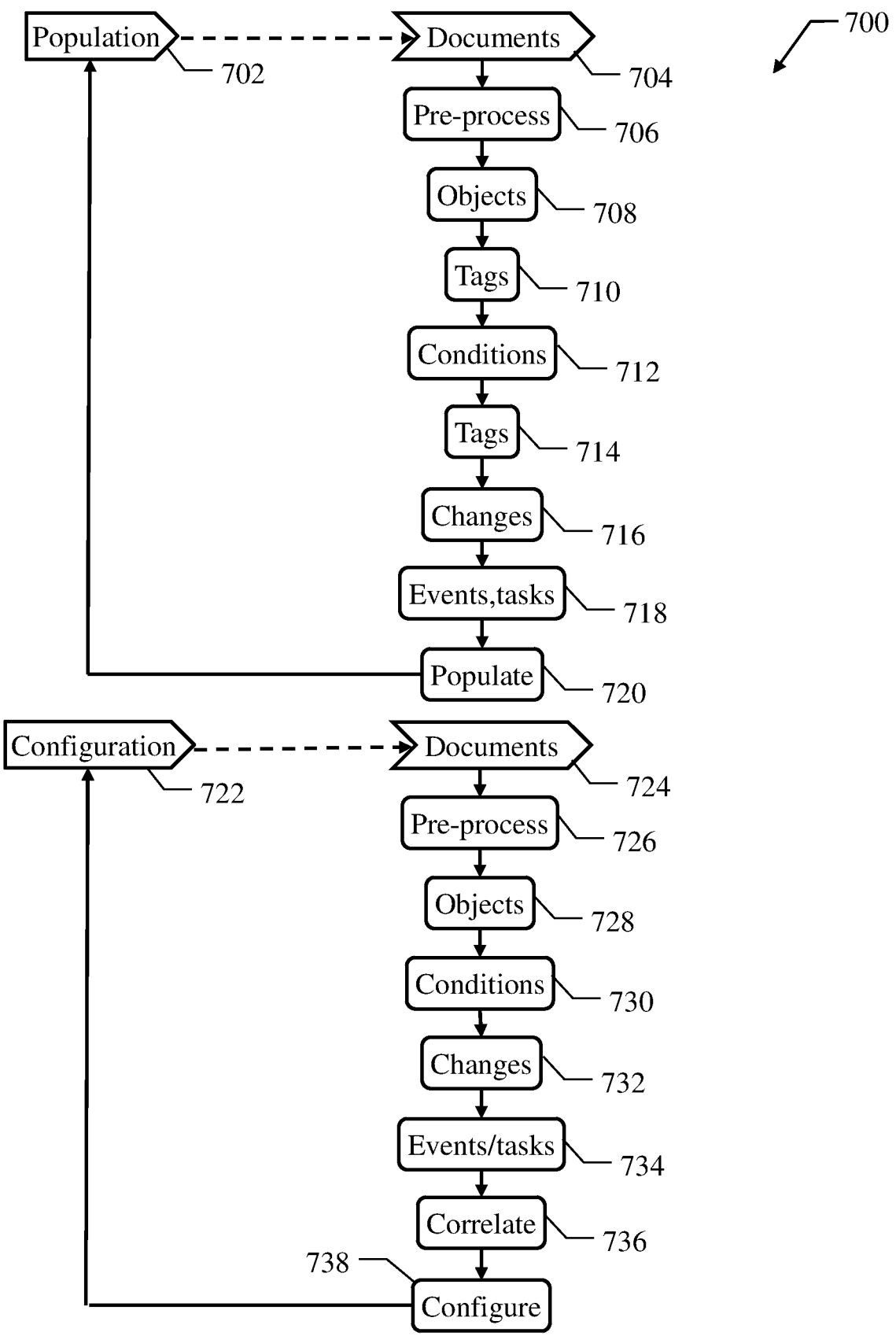
FIG. 7A is a flowchart of a method for populating a process model in accordance with at least one embodiment of the present invention.

FIG. 7A is a flowchart of a method for populating a process model in accordance with at least one embodiment of the present invention.

The method proceeds from block 702 to block 704 in response to a population request for populating a recognition model of a process is received. For example, this may occur at an installation time or whenever maintenance is required (e.g., in response to an unusual event notification, detected changes in the process, or perceived quality degradations of the workflow management). In response to receiving the population request, the document collectors collect one or more documents. For example, the documents are collected by prompting an operator to scan papers, by reading/downloading videos, photographs, audios, text or multimedia files, by reading/downloading formatted files, by invoking Application Program Interfaces (APIs) of software programs for receiving corresponding responses, and so on.

At block 706, the document collectors optionally pre-process the documents. For example, Optical Character Recognition (OCR) techniques are applied to the documents being scanned to convert their textual content into computer-readable form, conversion techniques are applied to convert the documents into standard formats, and so on. At block 708, the recognition engine detects the objects that are present in the documents. For example, the recognition engine applies image recognition techniques to videos/photographs, speech recognition techniques to audios, Natural Language Processing (NLP) techniques to textual documents, parsers to formatted documents and responses from software programs, and so on.

At block 710, the recognition engine identifies the detected objects by assigning them corresponding tags. This operation may be performed manually and/or automatically. Particularly, the recognition engine tags the detected objects that match the definition of corresponding relevant objects already defined in the recognition model (either directly or after confirmation by the subject matter experts). For those detected objects that do not match a definition of a corresponding relevant object already defined in the recognition model, the recognition engine prompts the subject matter experts experts to tag them manually. In any case, the recognition engine discards the detected objects that are not of interest. As a result, only identified objects being tagged remain as being relevant to the process.

At block 712, the recognition engine detects all of the conditions of the identified objects that are present in the documents. At block 714, the recognition engine identifies the detected conditions by assigning them corresponding tags (manually and/or automatically as above). As a result, only identified conditions being tagged remain as being relevant to the process. At block 716, the recognition engine determines all of the changes of the identified conditions of each identified object that are present over time in the documents. For this purpose, the identified conditions of each identified object are arranged in sequence. This is immediate when the identified conditions have been detected in documents that natively provide information over time (such as videos, timestamped photographs and audios). In other cases, instead, the recognition engine infers the sequence of the identified conditions from their contexts in the corresponding documents (for example, by applying NLP techniques to textual documents).

At block 718, the recognition engine identifies the events and the tasks in the documents, each defined by one or more changes of the identified conditions of one or more identified objects, by assigning them corresponding tags (either manually and/or automatically as above). As a result, only identified events and identified tasks being tagged remain as being relevant to the process.

At block 720, the population engine populates the recognition engine according to the identified objects, the identified conditions, the identified events, and the identified tasks. Particularly, in an embodiment utilizing deep learning techniques, the population engine uses the documents and the identified objects/conditions to train a neural network of the recognition engine, so as to make the neural network capable of recognizing them in any other documents. The population engine updates the relevant events/conditions in the recognition model according to the identified events/conditions. The method then returns to the block 702 and waits for a subsequent population request.

The method passes from block 722 to block 724 in response to a configuration request for configuring the process model of a process. For example, this may occur at an installation time or whenever maintenance is required (e.g., in response to an unusual event notification, detected changes in the process, or perceived quality degradations of the workflow management). In response to receiving the configuration request, the document collectors collect one or more configuration documents as above.

At block 726, the document collector optionally pre-processes the collected documents. Particularly, in the case in which the configuration request arises from the notification of an anomaly in the workflow of the process (as described in the following), the documents are a portion of the same documents already used to control the workflow of the process, relating to a scene corresponding to the anomaly (for example, from its notification up to the recognition of a next event returning to be compliant with the process model, i.e. being expected in the corresponding state of the process). At block 728, the recognition model recognizes any objects that are present in the documents, and that match the definition of corresponding relevant objects defined in the recognition model. For each recognized object, the recognition engine also determines a corresponding confidence index that indicates a level of confidence that the document actually contains the corresponding relevant object.

At block 730, the recognition model further recognizes any conditions of the recognized objects that are present in the documents, and that match the definition of corresponding relevant conditions defined in the recognition model. For each recognized condition, the recognition engine also determines a corresponding confidence index that indicates a level of confidence that the recognized object actually matches a corresponding relevant condition in the document. In an embodiment in which deep learning techniques are employed, each document is supplied to a neural network of the recognition engine, which directly outputs the tags of any recognized objects/conditions that are present in the document, together with their confidence indexes.

At block 732, the recognition engines determines any changes of the recognized conditions of each recognized object that are present over time in the documents as above. At block 734, the recognition engine determines any events/ tasks defined by the changes of the recognized conditions that match the definition of corresponding relevant events/tasks in the recognition model. For each potential event/task, the recognition engine also calculates a corresponding confidence index that indicates a level of confidence that the corresponding relevant event/task is actually present in the document. The confidence index of the potential event/task is based on the confidence indexes of the corresponding recognized conditions (whose changes define it), and on the confidence indexes of their recognized objects (e.g., equal to their product). The recognition engine then discards the potential events/tasks whose confidence indexes are lower than a predefined recognition threshold THr (e.g., defined by a configuration parameter of the recognition engine, such as THr=0.5-0.7). As a result, only recognized events/tasks that are recognized in the documents with an acceptable degree of confidence are kept.

At block 736, the recognition engine correlates the recognized events with the recognized tasks. This operation may be performed manually and/or automatically. Particularly, the recognition engine may determine that a recognized event involves the execution of a recognized task when they are closely in succession. Subject matter experts may use the GUI of the configuration engine to arrange the recognized events/tasks in their causal sequence.

At block 738, the configuration engine configures the process model according to the correlations of the recognized events/tasks (i.e., with nodes corresponding to the recognized tasks and transitions corresponding to the recognized events). The method then returns to block 722 and waits for a subsequent configuration request.

Figure 7B:
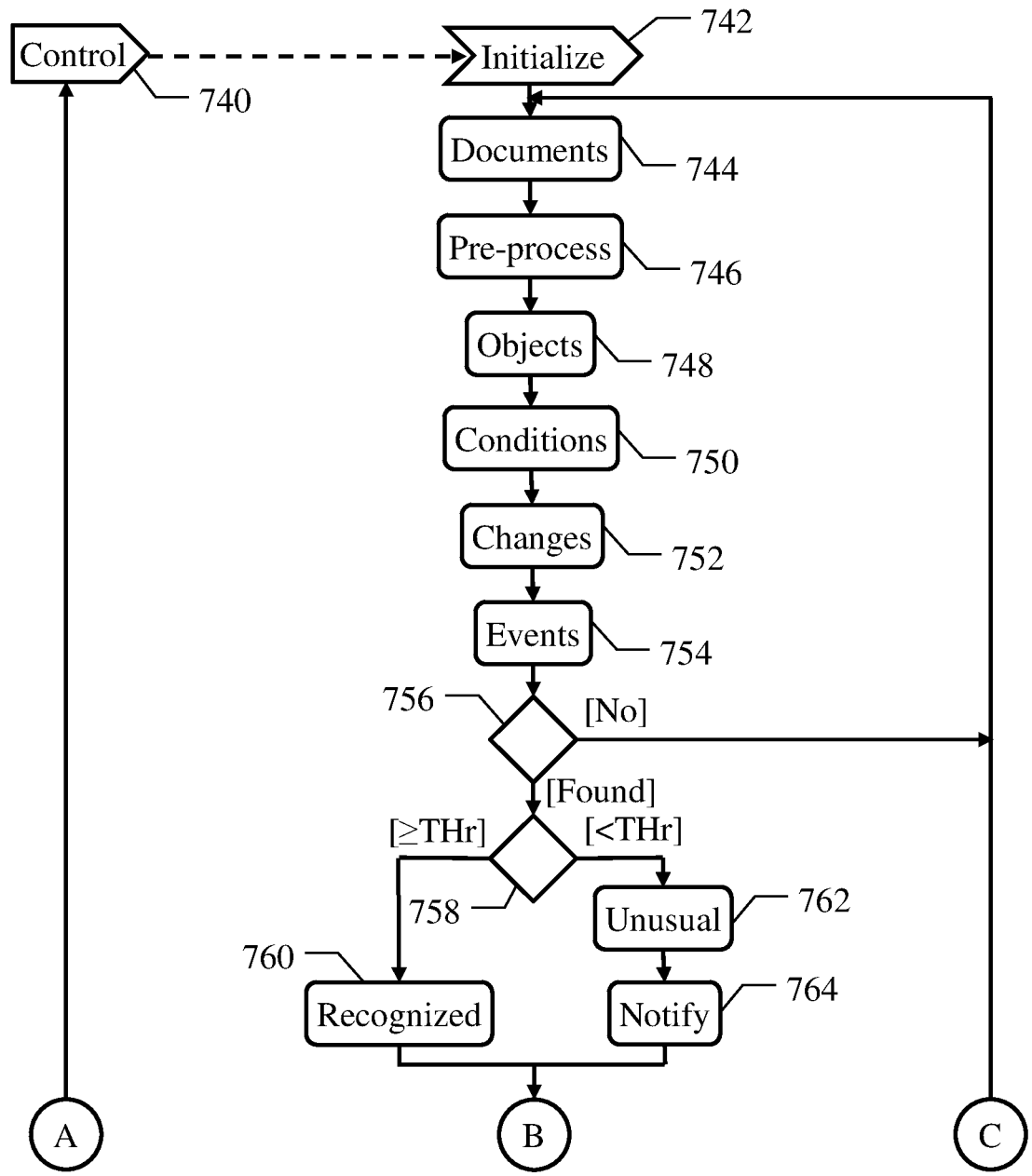
FIG. 7B is a flowchart of a method for configuring a process model in accordance with at least one embodiment of the present invention.

FIG. 7B is a flowchart of a method for configuring a process model in accordance with at least one embodiment of the present invention. The method passes from block 740 to block 742 in response to a workflow control request (e.g., by a scheduling system) In response to the workflow control request, the control engine initializes the workflow by setting a current state of the process to an initial state. At block 744, the document collector collects one or more control documents as above. The documents now relate to the current state of the process (e.g., they are documents just issued, videos/photographs/audios just acquired, responses just received, and so on). At block 746, the document collector optionally pre-processes the collected.

At block 748, and as above, the recognition engine recognizes any objects that are present in the documents, and that match the definition of corresponding relevant objects defined in the recognition model, together with their confidence indexes. At block 750, and as above, the recognition engine further recognizes any conditions of the recognized objects that are present in the documents, and that match the definition of corresponding relevant conditions defined in the recognition model, together with their confidence indexes.

At block 752, the recognition engine determines any changes of the recognized conditions of each recognized object that are present over time in the documents At block 754, the recognition engine verifies whether the changes of the recognized conditions allow recognizing, at least partially, any of the relevant events of the recognition model. For this purpose, the recognition engine determines any distinguished events defined by the changes of the recognized conditions that match the definition of corresponding relevant events in the recognition model, and whose confidence indexes (calculated as above from the confidence indexes of the corresponding recognized conditions and of their recognized objects) are higher than a predetermined non-recognition threshold. In an embodiment, the predetermined non-recognition threshold THn is lower than the recognition threshold THr (for example, with THn ranging from 0.8*THr to 0.9*THr).

At block 756, the method branches according to a result of this verification. If no distinguished event has been found, the method returns to the block 744. Conversely, if a distinguished event has been found, the method further branches at block 758 based on how the result has been achieved. Particularly, if the confidence index of the distinguished event is higher than the predetermined recognition threshold, the control engine at block 760 considers it a recognized event that is actually recognized in the documents with an acceptable degree of confidence. Conversely, if the confidence index of the distinguished event is lower than the predetermined recognition threshold (i.e., it is between the non-recognition threshold and the recognition threshold), the control engine at block 762 considers it an unusual event that is similar to the corresponding relevant event defined in the recognition model.

In response thereto, at block 764, the control engine outputs a corresponding unusual event warning (for example, by displaying an indication of the current state, the tag of the unusual event and its confidence index on a monitor of the computer, logging the same information, and sending a corresponding e-mail to an administrator). At the same time, the control engine may notify an anomaly due to the unusual event to the configuration engine (to learn a possible new pattern of the process). For example, this happens when the same unusual event is recognized in the same state of the process with a frequency that is higher than a predetermined unusual threshold (for example, defined by a configuration parameter of the control engine, such as every 20-100 events). In fact, the corresponding frequent repetition of the same unusual event is indicative of the fact that it has become usual and that a corresponding update of the process model would be desirable.

Figure 7C:
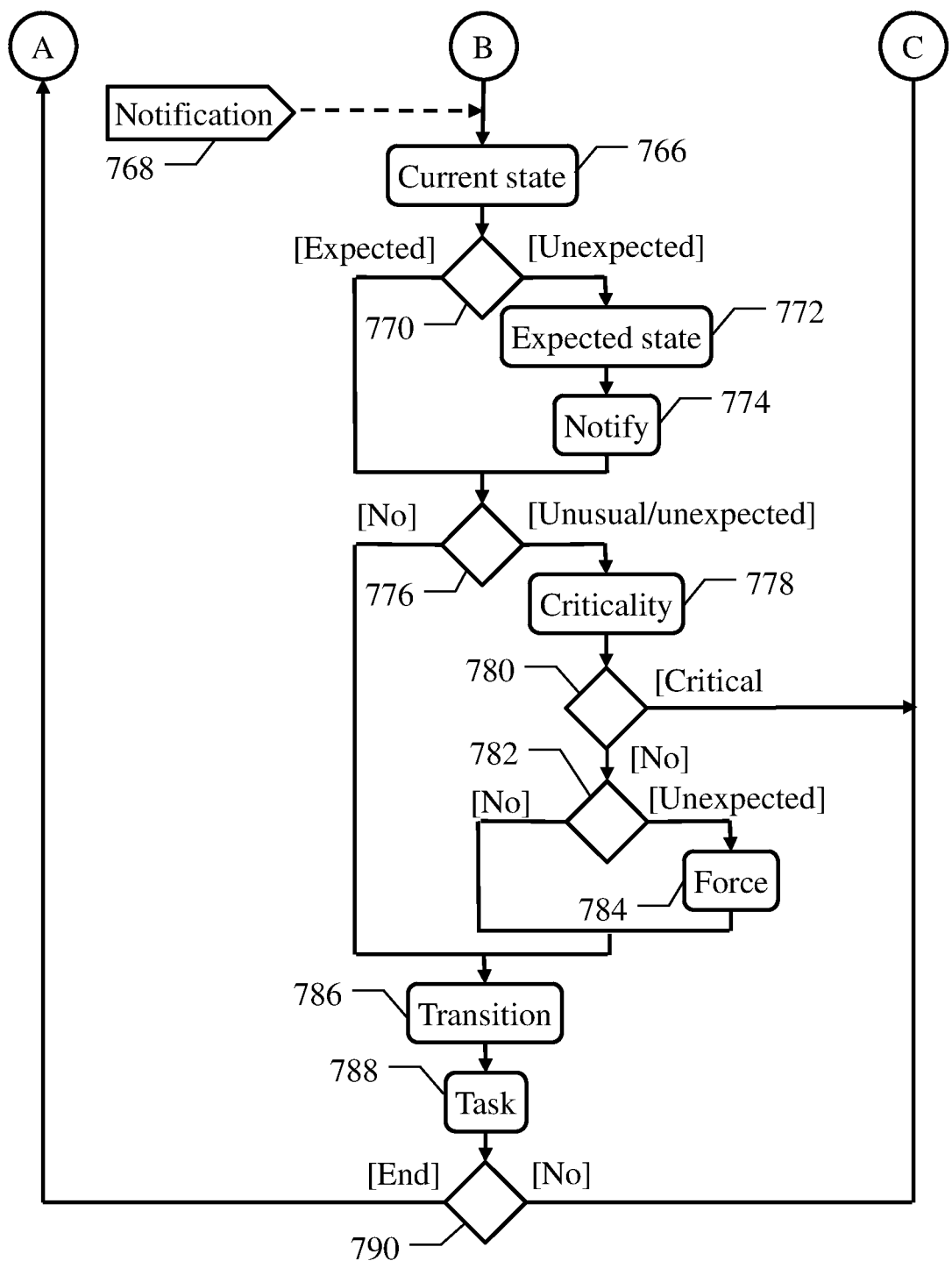
FIG. 7C is a flowchart of a method for controlling the workflow of a process in accordance with at least one embodiment of the present invention.

FIG. 7C is a flowchart of a method for controlling the workflow of a process in accordance with at least one embodiment of the present invention. The method merges again at block 766 from the block 760 or from block 764. The same point is also reached (asynchronously) from block 768 as soon as the event monitor detects the occurrence of a detected event (being one of the modeled events of the process model by construction), and notifies the control engine accordingly. At this point, the control engine compares the (recognized/unusual/detected) event with ones that trigger corresponding transitions in the current state (as defined in the above process).

The method branches at block 770 according to a result of this operation. If the event is not included in the events of the current state, it means that it is an unexpected event that is not expected in the current state. In response thereto, at block 772, the control engine identifies an expected state of the process in which the unexpected event is instead expected. For example, the control engine determines all of the states of the process whose events comprise the unexpected one, and selects the closest one to the current state (such as the one that is spaced apart by the lowest number of transitions). If the distance of the selected state from the current state is lower than a predetermined distance threshold, the expected state is set to the selected state. Conversely, the expected state is set to a null value.

At block 774, the control engine outputs a corresponding unexpected event warning as above (for example, comprising an indication of the current state, the tag of the unexpected event, and an indication of the expected state). At the same time, the control engine may notify an anomaly due to the unexpected event to the configuration engine (to learn a possible new pattern of the process). For example, as above, this may occur when the same unexpected event is recognized in the same state of the process with a frequency that is higher than a predetermined unexpected threshold (for example, again defined by a configuration parameter of the control engine, such as every 20-100 events). In fact, the corresponding frequent repetition of the same unexpected event is very likely to be indicative of the fact that it is not due to exceptional circumstances, but instead to a change of the process.

The method then continues to block 776, in which the same point is also reached directly from the block 770 if the event is included in an event of the current state. In other words, the event is an expected event that is expected in the current state. The method branches according to the type of the event. If the event is unusual and/or unexpected, at block 778, the control engine determines a level of criticality relating thereto. For example, the level of criticality is set to high when at least one among the criticality indicators of the whole process, of the current state, or of the possible expected state is asserted (or when the expected state has the null value in case of unexpected event), whereas it is set to low otherwise.

The method then branches at block 780 according to the level of criticality. If the level of criticality is high or in any case when the control engine is not configured to accept unusual/unexpected events, or when the administrator does not accept this unusual/unexpected event, the control engine discards the unusual/unexpected event by returning to the block 744 Conversely (either automatically or after a manual confirmation by an administrator), the method proceeds to block 782, wherein the method further branches according to the type of event. If the event is unexpected (and possibly unusual as well), at block 784, the control engine forces the current state of the process to the expected state.

The flow of activity merges again at block 786 from the block 784, from the 782 (if the event is not unexpected), or from the block 776 (if the event is expected). At this point, the control engine moves the current state of the process to the target state of the transition that is triggered in the current state by the (expected/unusual/unexpected) event, as indicated in the process model. In response thereto, at block 788, the control engine causes the execution of the corresponding task, as indicated in the process model as well (by automatically performing its activities when possible or requesting their execution to human beings otherwise). At block 790, the control engine verifies whether the control of the workflow of the process is still in progress. If so, the procedure returns to the block 744. Conversely, the method ends by returning to block 740 to wait for a subsequent workflow control request for controlling the workflow of the process.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
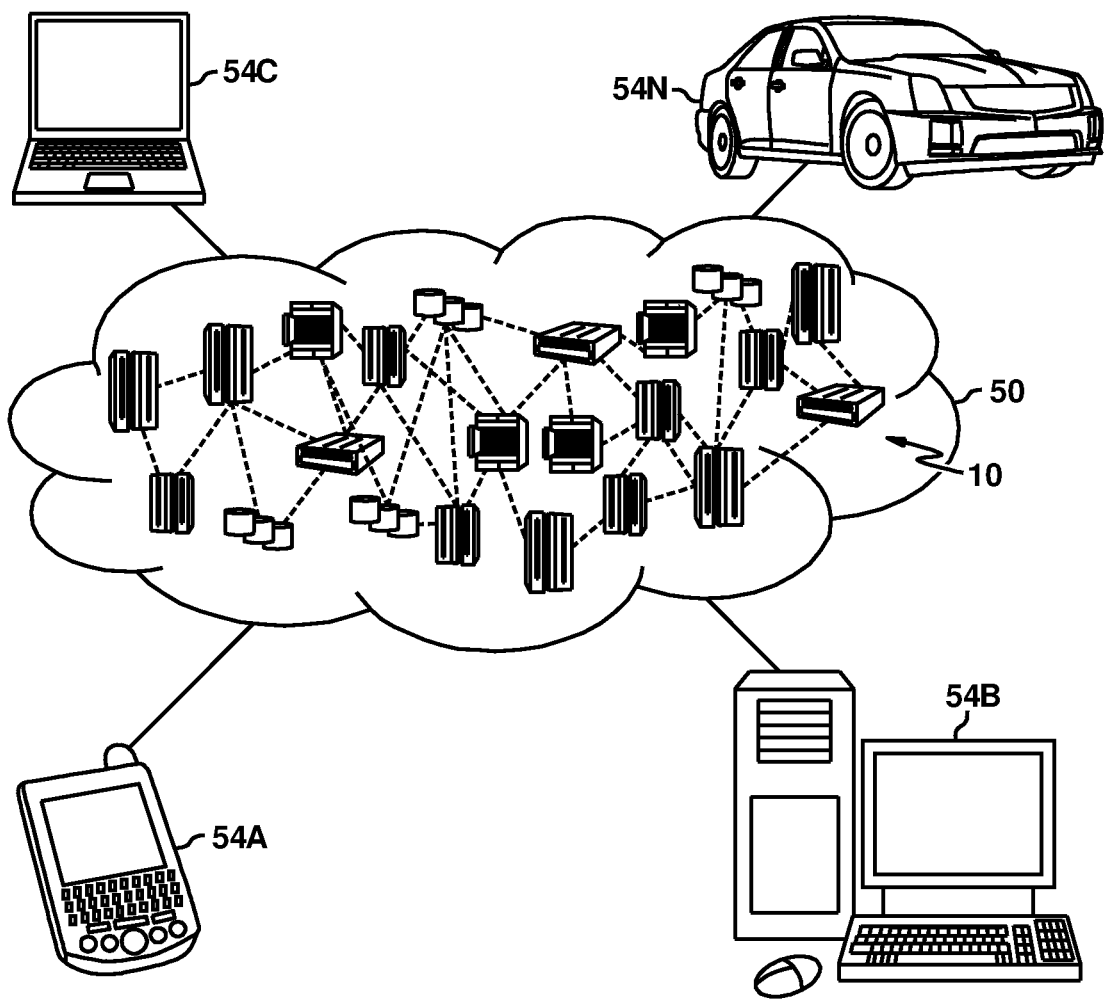
FIG. 8 is a block diagram depicting a cloud computing environment 50 in accordance with at least one embodiment of the present invention.

FIG. 8 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
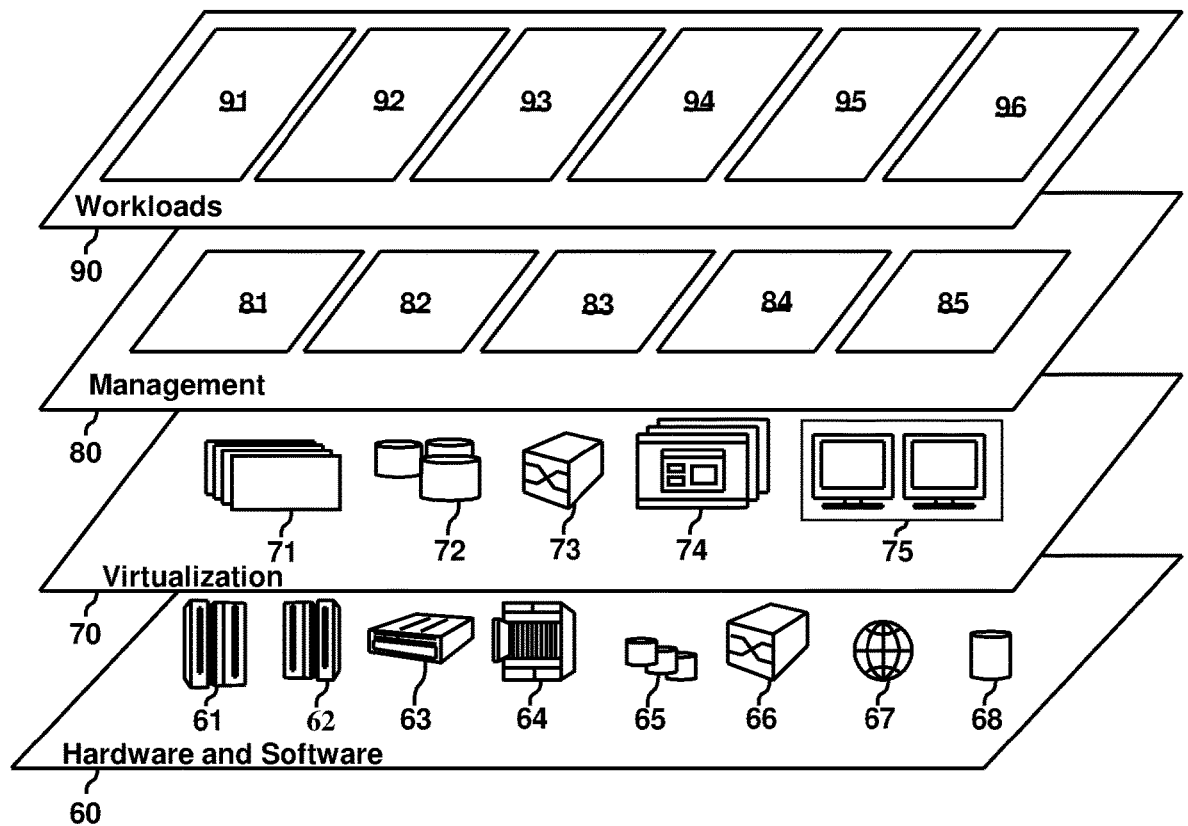
FIG. 9 is a block diagram of a set of functional abstraction model layers provided by cloud computing environment 50 depicted in FIG. 7 in accordance with at least one embodiment of the present invention.

FIG. 9 is block diagram depicting a set of functional abstraction model layers provided by cloud computing environment 50 depicted in FIG. 8 in accordance with at least one embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow management 96.

In an embodiment of the invention, a method for managing a workflow of a process is provided. It should be noted that the process may be of any type (for example, partial, different and additional types with respect to the ones mentioned above) and its workflow may be managed in any way (for example, for controlling, monitoring, auditing and so on).

In an embodiment, the method comprises the following steps under the control of a computing system. In an embodiment, the method comprises receiving, by a computing system, a recognition model. However, the recognition model may be provided in any way (for example, populated by recognizing relevant entities thereof from documents, received ready for use from similar contexts, generated by customizing a general-purpose template for a corresponding field and so on).

In an embodiment, the recognition model defines one or more relevant objects. However, the objects may be in any number and of any type (for example, partial, different and additional objects with respect to the ones mentioned above) and they may be defined in any way for their recognition (for example, implicitly by parameters of a neural network, explicitly in any format, such as a database, and so on).

In an embodiment, the recognition model defines one or more relevant conditions of the objects. However, the conditions may be in any number and of any type (for example, partial, different and additional conditions with respect to the ones mentioned above) and they may be defined in any way for their recognition (for example, implicitly by parameters of a neural network, explicitly in any format, such as a database, and so on).

In an embodiment, the recognition model defines one or more relevant events and one or more relevant tasks with each of the events and the tasks based on one or more changes of the conditions. However, the events and the tasks may be in any number and of any type (for example, partial, different and additional events/tasks with respect to the ones mentioned above) and they may be defined in any way for their recognition (for example, each explicitly by any number of changes of the conditions of any number of objects in any format, implicitly by parameters of a neural network and so on).

In an embodiment, the method comprises receiving, by the computing system, one or more configuration documents, wherein the one or more configuration documents provide information relating to the process. However, the configuration documents may be of any type (for example, partial, different and additional types with respect to the ones mentioned above); moreover, the configuration documents may be in any number (for example, different from the control documents, the same as the control documents or any portion thereof, and so on) and they may be provided in any way (for example, in push mode, in pull mode and so on).

In an embodiment, the method comprises recognizing, by the computing system, an indication of one or more recognized objects of the relevant objects and an indication of one or more recognized conditions of the relevant conditions in the configuration documents according to the recognition model. However, the recognized objects/conditions may be in any number and they may be recognized in any way (for example, with deep learning techniques, classification algorithms, regression algorithms, genetic algorithms, with or without corresponding confidence indexes, automatically or requiring human confirmation, and so on).

In an embodiment, the method comprises recognizing, by the computing system, one or more events of the relevant events and one or more tasks of the relevant tasks from changes of the recognized conditions over time in the configuration documents according to the recognition model. However, the recognized events/tasks may be in any number and they may be recognized in any way (for example, based on corresponding confidence indexes, in a deterministic way, with fuzzy-logic techniques, automatically or requiring human confirmation, and so on); in any case, the operations of recognizing the events/tasks may be distinct from the operations of recognizing the objects/conditions or these operations may be combined together (directly providing the recognized events/tasks from the configuration documents).

In an embodiment, the method comprises configuring, by the computing system, a process model of the process according to the recognized events and the recognized tasks over time. However, the process model may be configured in any way (for example, by correlating the recognized events and the recognized tasks automatically, semi-automatically or manually, incrementally or completely, and so on) and at any time (for example, before deploying the process model, during any maintenance thereof, in response to any anomaly in the workflow of the process, continuously during the control of the workflow of the process and so on).

In an embodiment, the process model sequences one or more modeled tasks depending on one or more modeled events for use to manage the workflow of the process. However, the process model may comprise any number and type of modelled events/tasks (for example, only the events/tasks of the recognition model or part thereof, one or more additional events/tasks, and so on) and it may sequence the tasks in response to the events in any way (for example, by associating the tasks with the entry into corresponding states, with the exit from corresponding states, with corresponding events, any combination thereof and so on).

Further embodiments provide additional advantageous features, which may however be omitted at all in a basic implementation. Particularly, in an embodiment, the configuration documents comprise one or more videos. However, the videos may of any type (for example, in any format, with any frame-rate, with any resolution and so on).

In an embodiment, the method comprises receiving, by the computing system, one or more population documents. However, the population documents may be in any number and they may be provided in any way (for example, either the same or different with respect to the configuration documents).

In an embodiment the population documents comprise one or more videos. However, the videos may of any type (for example, either the same or different with respect to the configuration documents).

In an embodiment, the method comprises prompting, by the computing system, a user to identify an indication of one or more of the identified objects, one or more of the identified conditions, one or more of the identified events, and one or more of the identified tasks in the population documents. However, these entities (objects, conditions, events and tasks) may be identified in any way (for example, semi-automatically by detecting all the entities in the documents automatically and then requesting the user to identify the ones of interest among them, manually by identifying the entities directly in the documents and so on) by any user (for example, one or more experts, administrators and so on).

In an embodiment, the method comprises populating, by the computing system, the recognition model according to the identified objects, the identified conditions, the identified events, and the identified tasks. However, the recognition model may be populated in any way (for example, by training a neural network, refining a classification/regression algorithm, incrementally or completely, and so on).

In an embodiment, the method comprises detecting, by the computing system, an indication of the one or more detected objects in the population documents. However, the objects may be detected in any number and in any way (for example, with image recognition, speech recognition, NLP and the like techniques, with parsers, with machine learning techniques and so on).

In an embodiment, the method comprises prompting, by the computing system, the user to identify the objects among the detected objects. However, the user may be prompted to identify the objects in any way (for example, by selecting/discarding the detected objects, by entering/updating/accepting corresponding tags and so on).

In an embodiment, the method comprises detecting, by the computing system, an indication of one or more of the detected conditions of the identified objects in the population documents. However, the conditions may be detected in any number and in any way (for example, with techniques that are either the same or different with respect to the ones used for the objects); moreover, this operation may be performed only for the objects that have already been identified or for all the objects together with their identification.

In an embodiment, the method comprises prompting, by the computing system, the user to identify the identified conditions among the detected conditions. However, the user may be prompted to identify the conditions in any way (for example, either the same or different with respect to the objects).

In an embodiment, the method comprises determining, by the computing system, an indication of one or more changes of the identified conditions of each of the identified objects over time in the population documents. However, the changes may be determined in any number and in any way (for example, all the possible ones given by different consecutive identified conditions of each identified object, by filtering them according to corresponding confidence indexes and so on).

In an embodiment, the method comprises prompting, by the computing system, the user to identify the identified events and the identified tasks based on the changes of the identified conditions. However, the user may be prompted to identify the events/tasks in any way (for example, by selecting/discarding the changes, entering/updating/accepting correlations among the changes with any GUIs or commands, entering/updating/accepting corresponding tags and so on).

In an embodiment, the method comprises receiving, by the computing system, a notification of one of the modeled events. However, the event may be notified in any way (for example, directly from event detectors, by recognizing it from documents according to the recognition model, any combination thereof and so on); in the first case, the event may be detected by any event detectors (for example, partial, different and additional event detectors with respect to the ones mentioned) and in any way (for example, in push mode, in pull mode and so on).

In an embodiment, the method comprises controlling, by the computing system, the workflow of the process in response to the notified event according to the process model. However, the workflow may be controlled in any way (for example, by automating activities, by providing what is required for executing activities, by requiring human beings to execute activities and so on).

In an embodiment, the method comprises providing, to the computing system, one or more control documents relating to a current state of the process. However, the control documents may be in any number and they may be provided in any way (for example, either the same or different with respect to the configuration/population documents); moreover, the control documents may relate to the current state in any way (for example, issued, acquired or received over any last time-frame, starting from the entering into the current state and so on).

In an embodiment, the control documents comprise one or more videos. However, the videos may of any type (for example, either the same or different with respect to the configuration/population documents).

In an embodiment, the method comprises recognizing, by the computing system, an indication of one or more further recognized objects of the relevant objects and an indication of one or more further recognized conditions of the relevant conditions in the control documents according to the recognition model. However, the further recognized objects/conditions may be in any number and they may be recognized in any way (for example, either the same or different with respect to the recognized objects/conditions).

In an embodiment, the method comprises recognizing, by the computing system, the notified event as one of the relevant events from changes of the further recognized conditions over time in the control documents according to the recognition model. However, this operation may recognize any number of events; moreover, the event(s) may be recognized in any way (for example, either the same or different with respect to above).

In an embodiment, the method comprises outputting, by the computing system, an unexpected event warning in response to the notified event being an unexpected event that is not expected in a current state of the process according to the process model. However, the unexpected event warning may have any content (for example, an indication of the unexpected event with or without any additional information, such as partial, different and additional pieces of information with respect to the ones mentioned above) and it may be output in any way (for example, locally, remotely, both of them and so on). In any case, the features relating to the unexpected event may also be implemented independently of the features relating to the configuration of the process model based on the recognition of the content of documents.

In an embodiment, the method comprises forcing, by the computing system, the workflow to an expected state, wherein the unexpected event is expected according to the process model in response to the unexpected event. However, the expected state may be determined in any way (for example, as the closest one, the most similar one and the like to the current state, automatically, semi-automatically or manually, and so on) and the process may be forced to it in any way (for example, automatically, requiring a manual confirmation and so on). The acceptance of the unexpected event may be conditioned on any definition of the corresponding criticality (for example, at the level of the whole process, the current state, the expected state, any combination thereof and so on), any difference between the expected state and the current state, may be indiscriminate or may be not supported at all.

In an embodiment, the method comprises recognizing, by the computing system, an unusual one of the events as similar to one of the relevant events from changes of the further recognized conditions over time in the control documents according to the recognition model. However, the unusual event may be recognized in any way (for example, by comparing its confidence index with different thresholds, directly as a result of the recognition, among the relevant events that are expected in the current state only or among all the relevant events, and so on).

In an embodiment, the method comprises outputting, by the computing system, an unusual event warning in response to the unusual event. However, the unusual event warning may have any content (for example, an indication of the unusual event with or without any additional information, such as partial, different and additional pieces of information with respect to the ones mentioned above) and it may be output in any way (for example, either the same or different with respect to the unexpected event warning). In any case, the features relating to the unusual event may be implemented independently of the features relating to the configuration of the process model based on the recognition of the content of documents (either in alternative or in combination with the features relating to the unexpected event).

In an embodiment, the method comprises recognizing, by the computing system, the unusual event in response to a corresponding confidence index being between a non-recognition threshold and a recognition threshold. However, the confidence index may be determined in any way (for example, as any combination of confidence indexes of the corresponding further recognized conditions and/or of the corresponding further recognized objects, such as their product, mean, median and the like, directly for the event and so on) and the recognition/non-recognition thresholds may have any values (for example, being minimum acceptable values, maximum acceptable values, with any relative values and so on).

In an embodiment, the method comprises controlling, by the computing system, the workflow of the process in response to the unusual event, and in response to the corresponding relevant event according to the process model. However, the unusual event may be accepted in any way (for example, automatically, requiring a manual confirmation and so on); moreover, the acceptance of the unusual event may be conditioned on any definition of the corresponding criticality (for example, either the same or different with respect to the unexpected event), may be indiscriminate or may be not supported at all.

In an embodiment, the method comprises recognizing, by the computing system, an anomaly in the workflow of the process. However, the anomaly may be recognized in any way (for example, in response to any repetition of a same unusual and/or unexpected event, to each unusual and/or unexpected event, to any repetition of a same task that is not expected at a same current state of the process, to each task that is not expected at the current state of the process, and so on).

In an embodiment, the method comprises revising, by the computing system, the process model according to the anomaly. However, the process model may be revised in any way (for example, either the same or different with respect to its configuration, for updating its states, events and/or tasks, and so on).

In an embodiment, the method comprises revising, by the computing system, the process model according to the anomaly, and in response to a repetition of the anomaly with a frequency higher than an anomaly threshold. However, the anomaly threshold may be of any type (for example, in terms of anomalies over time, anomalies over events and so on) and with any value (for example, fixed, customizable and so on).

In an embodiment, the method comprises recognizing, by the computing system, the anomaly corresponding to an unexpected one of the events being not expected in a current state of the process according to the process model and/or to an unusual one of the events being similar to one of the relevant events from changes of the further recognized conditions over time in the control documents according to the recognition model However, the unexpected/unusual events may be recognized in any way (see above).

In an embodiment, the method comprises recognizing, by the computing system, one or more further recognized tasks of the relevant tasks from changes of the further recognized conditions over time in the control documents following the anomaly according to the recognition model. However, the further recognized tasks may be recognized in any way (for example, either the same or different with respect to above in any portion of the control document, such as up to a next expected event, within a predefined period and so on).

In an embodiment, the method comprises revising, by the computing system, the process model further according to the further recognized tasks. However, the process model may be revised according to the further recognized tasks in any way (for example, by adding a new state involving the execution of the further recognized tasks, by adding a new transition to a pre-existing state already involving the execution of the further recognized tasks and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

According to an embodiment of the present invention, a computer program product configured for causing a computing system to perform the method of above when the computer program is executed on the computing system is provided. The computer program product comprises one or more computer readable storage media having program instructions collectively stored in said one or more computer readable storage media, the program instructions readable by a computing system to cause the computing system to perform the same method. However, the program may be implemented as a stand-alone module, as a plug-in for a pre-existing program (for example, a standard workflow management application), or even directly in the latter; moreover, the program may take any form suitable to be used by any computing system (see below).

According to an embodiment of the present invention, a computing system embodiment provides a computing system configured for performing the steps of the above-described method is provided. The computing system comprises a circuitry (i.e., any hardware suitably configured, for example, by software) for performing each step of the same method. However, the computing system may be of any type (for example, a PC, a server, a virtual machine and so on); moreover, the same solution may also be deployed as a service that is accessed through a network (such as in a cloud environment).

Generally, similar considerations apply if the computing system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A computer-implemented method for managing a workflow of a process, comprising:

generating a recognition model defining objects, conditions of the objects, events, and tasks associated with a process, wherein the events are detected changes in the conditions of the objects, and the tasks are executed in response to the detected events;

identifying, based on the recognition model, an object, and a condition from information associated with a current state of the process;

identifying, based on the recognition model, an event, and a corresponding task executed in response to the event from the information associated with the current process;

determining that the event is an unusual event based on a confidence index corresponding to the event being below a first predetermined threshold;

configuring a process model of the process to include the unusual event and the corresponding task in response to a frequency of occurrence of the unusual event and the corresponding task at a same state of the process exceeding a second predetermined threshold, wherein configuring the process model to include the unusual event and the corresponding task includes generating a node corresponding to the task and a transition corresponding to the event; and managing a workflow of the process based on the configured process model, wherein the configured process model dynamically self-adapts to changes in the process by learning from experiences acquired during control of the workflow of the process.

2. The computer-implemented method of claim 1, further comprising:

receiving population documents;

prompting a user to provide an indication of an identification of the object, the condition, the event, and the task in the population documents; and populating the recognition model according to the indicated identified object, condition, event, and task in the one or more population documents.

3. The computer-implemented method of claim 2, wherein the population documents include one or more videos.

4. The computer-implemented method of claim 2, further comprising:
   detecting the indication of the identification of the object in the population documents; and
   prompting the user to identify the object among the population documents.

5. The computer-implemented method of claim 4, further comprising:
   detecting the indication of the identification of the condition of the object among the population documents; and
   prompting the user to identify the one condition among the population documents.

6. The computer-implemented method of claim 5, further comprising:
   determining a change to the condition of the object over time in the population documents; and
   prompting the user to identify the event and the task based on the determined change to the condition of the object.

7. The computer-implemented method of claim 1, further comprising:
   generating a notification responsive to identifying a modeled event in the process; and managing the workflow of the process in response to receiving the user input associated with the modeled event.

8. The computer-implemented method of claim 7, further comprising:
   receiving control documents relating to the current state of the process;
   detecting, based on the recognition model, an indication of an additional object and an indication of an additional condition in the control documents; and
   determining that the modeled event is similar to the event based on changes to the additional condition of the additional object over time in the control documents.

9. The computer-implemented method of claim 8, wherein the control documents include one or more videos.

10. The computer-implemented method of claim 8, further comprising:
    generating an unexpected event warning in response to identifying, based on the process model, the unexpected event in the current state of the process.

11. The computer-implemented method of claim 10, further comprising:
    forcing the workflow to an expected state, wherein the unexpected event is expected based on the process model.

12. The computer-implemented method of claim 1, further comprising:
    receiving control documents associated with the current state of the process;
    identifying, based on the recognition model, an additional object and an additional condition in the control documents;
    determining, based on the recognition model, that the unusual event is similar to the event from changes to the additional condition over time in the control documents; and
    generating an unusual event warning in response to detecting the unusual event.

13. The computer-implemented method of claim 12, further comprising:
    controlling, based on the process model, the workflow of the process in response to determining the unusual event, wherein the unusual event is controlled in a same manner as controlling the corresponding event.

14. The computer-implemented method of claim 1, further comprising:
    identifying an anomaly in the workflow of the process; and
    adjusting the process model according to the anomaly.

15. The computer-implemented method of claim 14, wherein adjusting the process model according to the anomaly is responsive to a repetition of the anomaly with a frequency above an anomaly threshold.

16. The computer-implemented method of claim 14, further comprising:
    receiving control documents relating to the current state of the process;
    identifying, based on the recognition model, an additional task and an additional condition in the control documents;
    identifying, based on the process model, the anomaly corresponding to an unexpected event in the current state of the process;
    determining, based on the process model, that the anomaly corresponding to the unexpected event is similar to the event from changes to the additional condition over time in the control documents;
    identifying the additional task from the changes to the additional condition over time in the control documents; and
    adjusting the process model further according to the additional identified task.

17. A computer program product for managing a workflow of a process, the computer program product comprising one or more computer readable storage media and program instructions stored on the one or more computer readable storage media, the program instructions including instructions to:
    generate a recognition model defining objects, conditions of the objects, events, and tasks associated with a process, wherein the events are detected changes in the conditions of the objects, and the tasks are executed in response to the detected events;
    identify, based on the recognition model, an object, and a condition from information associated with a current state of the process;
    identify, based on the recognition model, an event, and a corresponding task executed in response to the event from the information associated with the current process
    determine that the event is an unusual event based on a confidence index corresponding to the event being below a first predetermined threshold;
    configure a process model of the process to include the unusual event and the corresponding task in response to a frequency of occurrence of the unusual event and the corresponding task at a same state of the process exceeding a second predetermined threshold, wherein configuring the process model to include the unusual event and the corresponding task includes generating a node corresponding to the task and a transition corresponding to the event; and
    manage a workflow of the process based on the configured process model, wherein the configured process model dynamically self-adapts to changes in the process by learning from experiences acquired during control of the workflow of the process.

18. A computer system for performing a classification of an input signal by a neural network, comprising:
- one or more computer processors;
- one or more computer readable storage media;
- computer program instructions, the computer program instructions being stored on the one or more computer readable storage media for execution by the one or more computer processors; and
- the computer program instructions including instructions to:
  - generate a recognition model defining objects, conditions of the objects, events, and tasks associated with a process, wherein the events are detected changes in the conditions of the objects, and the tasks are executed in response to the detected events;
  - identify, based on the recognition model, an object, and a condition from information associated with a current state of the process;
  - identify, based on the recognition model, an event, and a corresponding task executed in response to the event from the information associated with the current process;
  - determine that the event is an unusual event based on a confidence index corresponding to the event being below a first predetermined threshold;
  - configure a process model of the process to include the unusual event and the corresponding task in response to a frequency of occurrence of the unusual event and the corresponding task at a same state of the process exceeding a second predetermined threshold, wherein configuring the process model to include the unusual event and the corresponding task includes generating a node corresponding to the task and a transition corresponding to the event; and
  - manage a workflow of the process based on the configured process model, wherein the configured process model dynamically self-adapts to changes in the process by learning from experiences acquired during control of the workflow of the process.

* * * * *